(12) United States Patent
Oxford

(10) Patent No.: US 9,575,906 B2
(45) Date of Patent: Feb. 21, 2017

(54) METHOD AND SYSTEM FOR PROCESS WORKING SET ISOLATION

(71) Applicant: Rubicon Labs, Inc., San Francisco, CA (US)

(72) Inventor: William V. Oxford, Austin, TX (US)

(73) Assignee: Rubicon Labs, Inc., San Francisco, CA (US)

( * ) Notice: Subject to any disclaimer, the term of this patent is extended or adjusted under 35 U.S.C. 154(b) by 372 days.

(21) Appl. No.: 13/847,370

(22) Filed: Mar. 19, 2013

(65) Prior Publication Data

US 2013/0254494 A1    Sep. 26, 2013

Related U.S. Application Data

(60) Provisional application No. 61/613,290, filed on Mar. 20, 2012.

(51) Int. Cl.
*G06F 12/00* (2006.01)
*G06F 13/00* (2006.01)
(Continued)

(52) U.S. Cl.
CPC ...... *G06F 12/1466* (2013.01); *G06F 12/0837* (2013.01); *G06F 12/0842* (2013.01)

(58) Field of Classification Search
CPC ............. G06F 12/0837; G06F 12/0842; G06F 12/1458; G06F 12/1466; G06F 2212/60;
(Continued)

(56) References Cited

U.S. PATENT DOCUMENTS 4,293,910 A * 10/1981 Flusche ............... G06F 12/1466
711/157
4,656,474 A    4/1987 Mollier et al.
(Continued)

FOREIGN PATENT DOCUMENTS

DE     10224473 A1    12/2003
EP     0678836 A1    10/1995
(Continued)

OTHER PUBLICATIONS

Definition of "working set", Free On-line Dictionary of Computing, retrieved from http://foldoc.org/working+set on May 2, 2015 (4 pages).*

(Continued)

*Primary Examiner* — Daniel C Chappell
(74) *Attorney, Agent, or Firm* — Sprinkle IP Law Group

(57) ABSTRACT

Embodiments of systems and methods disclosed herein may isolate the working set of a process such that the data of the working set is inaccessible to other processes, even after the original process terminates. More specifically, in certain embodiments, the working set of an executing process may be stored in cache and for any of those cache lines that are written to while in secure mode those cache lines may be associated with a secure descriptor for the currently executing process. The secure descriptor may uniquely specify those cache lines as belonging to the executing secure process such that access to those cache lines can be restricted to only that process.

21 Claims, 17 Drawing Sheets

(51) Int. Cl.
*G06F 13/28* (2006.01)
*G06F 12/14* (2006.01)
*G06F 12/08* (2016.01)

(58) Field of Classification Search
CPC ....... G06F 2212/603; G06F 2212/6042; G06F 2212/6046; G06F 2212/62
USPC ........................................................ 711/145
See application file for complete search history.

(56) References Cited

U.S. PATENT DOCUMENTS

| | | | |
|---|---|---|---|
| 4,893,339 | A | 1/1990 | Bright et al. |
| 5,029,207 | A | 7/1991 | Gammie |
| 5,210,748 | A | 5/1993 | Onishi et al. |
| 5,210,870 | A | 5/1993 | Baum et al. |
| 5,222,136 | A | 6/1993 | Rasmussen et al. |
| 5,285,497 | A | 2/1994 | Thatcher |
| 5,343,527 | A | 8/1994 | Moore |
| 5,623,545 | A | 4/1997 | Childs et al. |
| 5,631,961 | A | 5/1997 | Mills et al. |
| 5,724,425 | A | 3/1998 | Chang et al. |
| 5,764,774 | A | 6/1998 | Liu |
| 5,912,974 | A | 6/1999 | Holloway et al. |
| 5,999,629 | A | 12/1999 | Heer et al. |
| 6,009,176 | A | 12/1999 | Gennaro et al. |
| 6,055,314 | A | 4/2000 | Spies et al. |
| 6,088,677 | A | 7/2000 | Spurgeon |
| 6,101,605 | A | 8/2000 | Buer |
| 6,226,742 | B1 | 5/2001 | Jakubowski et al. |
| 6,253,193 | B1 | 6/2001 | Ginter et al. |
| 6,263,313 | B1 | 7/2001 | Milsted et al. |
| 6,269,445 | B1 | 7/2001 | Nishioka et al. |
| 6,327,652 | B1 | 12/2001 | England et al. |
| 6,330,670 | B1 | 12/2001 | England et al. |
| 6,367,019 | B1 | 4/2002 | Ansell |
| 6,378,072 | B1 | 4/2002 | Collins et al. |
| 6,398,245 | B1 | 6/2002 | Gruse et al. |
| 6,412,070 | B1 | 6/2002 | Van dyke et al. |
| 6,438,653 | B1* | 8/2002 | Akashi ................ G06F 12/0831 711/128 |
| 6,550,011 | B1 | 4/2003 | Sims, III |
| 6,654,889 | B1 | 11/2003 | Trimberger |
| 6,681,214 | B1 | 1/2004 | Doljack |
| 6,683,954 | B1 | 1/2004 | Searle |
| 6,701,432 | B1 | 3/2004 | Deng et al. |
| 6,839,849 | B1 | 1/2005 | Ugon et al. |
| 6,865,675 | B1 | 3/2005 | Epstein |
| 7,185,369 | B2 | 2/2007 | Thoone et al. |
| 7,203,844 | B1 | 4/2007 | Oxford |
| 7,225,333 | B2 | 5/2007 | Peinado |
| 7,328,345 | B2 | 2/2008 | Morten et al. |
| 7,353,541 | B1 | 4/2008 | Ishibashi et al. |
| 7,457,968 | B2 | 11/2008 | Oxford |
| 7,568,112 | B2* | 7/2009 | Yamaguchi ......... G06F 12/0802 711/118 |
| 7,639,819 | B2 | 12/2009 | Ho et al. |
| 7,747,876 | B2 | 6/2010 | Oxford |
| 8,438,392 | B2 | 5/2013 | Oxford |
| 8,635,466 | B1 | 1/2014 | Feng |
| 8,726,035 | B2 | 5/2014 | Oxford |
| 8,972,746 | B2* | 3/2015 | Johnson .............. G06F 21/6218 713/189 |
| 9,298,894 | B2* | 3/2016 | Boivie .................. G06F 21/125 |
| 9,448,950 | B2* | 9/2016 | Scarlata .............. G06F 12/1466 |
| 2001/0033656 | A1 | 10/2001 | Gligor et al. |
| 2002/0002468 | A1 | 1/2002 | Spagna et al. |
| 2002/0002654 | A1* | 1/2002 | Tomohiro ........... G06F 12/1466 711/103 |
| 2002/0013772 | A1 | 1/2002 | Peinado |
| 2002/0019223 | A1 | 2/2002 | Lee et al. |
| 2002/0027992 | A1 | 3/2002 | Matsuyama et al. |
| 2002/0038231 | A1 | 3/2002 | Hasebe et al. |
| 2002/0138435 | A1 | 9/2002 | Williams et al. |
| 2002/0147920 | A1 | 10/2002 | Mauro |
| 2002/0152387 | A1 | 10/2002 | Asano |
| 2002/0154779 | A1 | 10/2002 | Asano et al. |
| 2002/0169971 | A1 | 11/2002 | Asano et al. |
| 2003/0037237 | A1 | 2/2003 | Abgrall et al. |
| 2003/0084298 | A1 | 5/2003 | Messerges et al. |
| 2003/0084306 | A1 | 5/2003 | Abburi et al. |
| 2003/0097578 | A1 | 5/2003 | England et al. |
| 2003/0177435 | A1 | 9/2003 | Budd et al. |
| 2004/0003248 | A1 | 1/2004 | Arkhipov |
| 2004/0016002 | A1 | 1/2004 | Handelman et al. |
| 2004/0107356 | A1 | 6/2004 | Shamoon et al. |
| 2005/0021941 | A1 | 1/2005 | Ohmori et al. |
| 2005/0058291 | A1 | 3/2005 | Candelore |
| 2006/0090073 | A1* | 4/2006 | Steinberg ................ G06F 21/31 713/170 |
| 2006/0101524 | A1 | 5/2006 | Weber |
| 2006/0253714 | A1 | 11/2006 | Ito |
| 2006/0265568 | A1 | 11/2006 | Burton |
| 2008/0240420 | A1 | 10/2008 | Oxford |
| 2009/0016534 | A1* | 1/2009 | Ortiz Cornet ........... G06F 21/64 380/277 |
| 2010/0122088 | A1* | 5/2010 | Oxford .................... G06F 21/10 713/168 |
| 2010/0235644 | A1 | 9/2010 | Oxford |
| 2010/0281220 | A1* | 11/2010 | Cantin .................. G06F 12/084 711/130 |
| 2011/0055585 | A1* | 3/2011 | Lee ....................... H04L 9/0844 713/183 |
| 2011/0225168 | A1 | 9/2011 | Burroughs et al. |
| 2013/0227302 | A1 | 8/2013 | Oxford |
| 2013/0238902 | A1 | 9/2013 | Oxford |

FOREIGN PATENT DOCUMENTS

| | | |
|---|---|---|
| EP | 1560361 A1 | 8/2005 |
| GB | 2341955 A | 3/2000 |
| JP | 58-75267 | 5/1983 |
| JP | 2000-155735 | 6/2000 |
| JP | 2001-160003 | 6/2001 |
| JP | 2002-372910 | 12/2002 |
| JP | 2003-101526 | 4/2003 |
| JP | 2003-234728 | 8/2003 |
| JP | 2005-346182 | 12/2005 |
| JP | 2006-222496 | 8/2006 |
| JP | 2009-181238 | 8/2009 |
| WO | WO2004/040397 A2 | 5/2004 |
| WO | WO 2005/088893 A1 | 9/2005 |
| WO | WO 2006/080754 A1 | 8/2006 |
| WO | WO 2008108764 A2 * | 9/2008 ........... G06F 21/602 |

OTHER PUBLICATIONS

New Cache Designs for Thwarting Software Cache-based Side Channel Attacks; Wang et al; Proceedings of the 34th annual international symposium on Computer architecture; Jun. 9, 2007; pp. 494-505 (12 pages).*

Office Action for U.S. Appl. No. 13/855,142, mailed Mar. 23, 2015, 5 pgs.

Office Action for U.S. Appl. No. 13/745,236, mailed Apr. 2, 2015, 11 pgs.

Office Action (with English translation) for Japanese Patent Application No. 2013-207092, mailed Aug. 6, 2015, 10 pgs.

Final Office Action issued for U.S. Appl. No. 13/745,236, mailed Apr. 2, 2014, 9 pages.

Office Action issued for Japanese Patent Application No. 2012-276507, mailed Jan. 7, 2014, 14 pages.

Office Action issued for Japanese Patent Application No. JP2011-535761, mailed Dec. 5, 2013, 12 pages.

Notice of Allowance issued for U.S. Appl. No. 12/788,516, mailed Dec. 23, 2013, 8 pages.

Lie, David, et al., "Architectural Support for Copy and Tamper-Resistant Software", 9th Annual Conf. on Architectural Support for Programming Languages . . . , Cambridge MA, 2000, pp. 1-10.

Office Action for U.S. Appl. No. 11/710,352, mailed Aug. 23, 2007, 4 pgs.

(56) References Cited

OTHER PUBLICATIONS

International Search Report and Written Opinion for International Patent Application No. PCT/US2007/005803, mailed Sep. 26, 2008, 8 pgs.
International Preliminary Report on Patentability for International Patent Application No. PCT/US2007/005803, mailed Sep. 17, 2009, issued Sep. 8, 2009, 5 pgs.
Office Action for U.S. Appl. No. 12/251,669, mailed Sep. 25, 2009, 5 pgs.
International Search Report and Written Opinion for PCT/US2009/063861, completed Dec. 23, 2009, mailed Jan. 12, 2010, 8 pgs.
Needham, Roger M. and Schroeder, Michael D., "Using Encryption for Authentication in Large Networks of Computers," Communications of the ACM, Dec. 1978, pp. 993-999, vol. 21, No. 12.
Berkovits, Shimshon, "How to Broadcast a Secret", Advances in Cryptology: EUROCRYPT'91, Lecture notes in Computer Science, 1991, pp. 536-541, Springer-Verlag.
Goldwasser, Shafi and Micali, Silvio, "Probabalistic Encryption," Journal of Computer and System Sciences, Apr. 1984, pp. 270-299, vol. 28, No. 2, St. Catherine Press Ltd., Bruges, Belgium.
Office Action for U.S. Appl. No. 12/788,516, mailed Aug. 10, 2011, 15 pgs.
Microsoft, Microsoft Computer Dictionary, May 2002, Fifth Ed., p. 50, ISBN 978-0-7356-1495-6.
Stallings, William, Cryptography and Network Security: Principles and Practice, 1998, 2d Ed., Ch. 8-10, pp. 237-263 and 271-314, ISBN: 0138690170.
Office Action for U.S. Appl. No. 12/788,516, mailed Jan. 6, 2012, 11 pgs.
Extended EP Search Report for European Patent Application No. 07 772 246.0, mailed Jan. 19, 2012, 8 pgs.
International Preliminary Report on Patentability for PCT Application No. PCT/US2009/063861, mailed May 19, 2011, 8 pgs.
Office Action (with English translation) for Japanese Patent Application No. 2009-552649 mailed Jun. 20, 2012, 9 pages, Japanese Patent Office.
Office Action for U.S. Appl. No. 12/615,843, mailed Sep. 26, 2012, 8 pgs.
Menezes, Alfred J. et al., "Handbook of applied cryptography," Ch. 9, Oct. 1996, pp. 321-383, ISBN: 0849385237.
Notice of Allowance for U.S. Appl. No. 12/615,843, mailed Jan. 2, 2013, 4 pgs.
Office Action (with English translation) for Japanese Patent Application No. 2009-552649, mailed Apr. 3, 2013, 10 pgs., Japanese Patent Office.
Office Action for U.S. Appl. No. 12/788,516, mailed Jun. 14, 2013, 12 pgs.
Office Action for U.S. Appl. No. 13/745,236, mailed Aug. 8, 2013, 8 pgs.
International Search Report and Written Opinion for International Patent Application No. PCT/US2013/033009, mailed Jun. 18, 2013, 10 pgs.
Supplementary European Search Report for European Patent Application No. 13/765,051, dated Aug. 31, 2015, 12 pgs.
Office Action for U.S. Appl. No. 13/855,142, mailed Sep. 30, 2015, 4 pgs.
Office Action for U.S. Appl. No. 13/745,236, mailed Nov. 4, 2015, 8 pgs.
Notice of Allowance for U.S. Appl. No. 13/855,142, mailed Jan. 21, 2016, 6 pgs.
Office Action for U.S. Appl. No. 13/745,236, mailed Jul. 29, 2016, 6 pgs.
Notice of Allowance for U.S. Appl. No. 13/855,142, mailed Aug. 16, 2016, 5 pgs.
Office Action issued for Japanese Patent Application No. 2013-207092, mailed Sep. 3, 2014, 13 pages.
International Preliminary Report on Patentability (IPRP) issued for PCT Application No. PCT/US2013/033009, mailed Oct. 2, 2014, 9 pages.
Office Action issued for Japanese Patent Application No. 2012-276507, mailed Oct. 21, 2014, 11 pages.
Office Action for European Patent Application No. 07772246.0, mailed Jan. 29, 2016, 6 pgs.
Office Action issued for U.S. Appl. No. 13/855,142, mailed Nov. 18, 2014, 9 pages.
Menezes et al. "Handbook of applied cryptography," Oct. 1996, ISBN: 0849385237, 66 pages.
William Stallings "Cryptography and Network Security Principles and Practice," Second Edition, ISBN: 0138690170, 1998, 56 pages.
Final Office Action issued for Japanese Patent Application No. 2009-552649, mailed Feb. 26, 2014, 11 pages.

* cited by examiner

METHOD AND SYSTEM FOR PROCESS WORKING SET ISOLATION

RELATED APPLICATIONS

This application claims a benefit of priority under 35 U.S.C. §119 to U.S. Provisional Patent Application No. 61/613,290 entitled "Method and System for Process Working Set Isolation" by William V. Oxford filed Mar. 20, 2012, which is hereby fully incorporated by reference in its entirety.

TECHNICAL FIELD

This disclosure relates in general to security in computer systems. More specifically, this disclosure relates to securing data (including instructions) associated with processes of a computing system. Even more particularly, this disclosure related to securing data associated with processes of a computing system that are executing in conjunction with an implementation of a recursive security protocol.

BACKGROUND

Computer viruses and other malicious software present a massive problem for the information technology industry. Since a general purpose computer can, by definition, run arbitrary code, it can be very difficult to maintain control over exactly which software is allowed to run, either in part or in whole, on a given general purpose computer platform. For this reason, it can be difficult to prevent the execution of malware or other types of undesirable software. There are a number of methods by which this level of control is currently attempted, but most efforts to isolate the processor from attack suffer from two fundamental problems: loss of generality in the processor platform or loss of performance. These losses stem from the basic issue of how to isolate data that must be kept secure from data that can be published freely and how to quickly and unequivocally distinguish between authorized and unauthorized usage modes.

A secondary, but related problem is that of copyright control. The vast majority of written, audio and visual works of art that are created today either begin or end up in digital format. One of the characteristics of digital data is that it can easily be substantially exactly duplicated. This property facilitates a wide variety of inexpensive distribution mechanisms, most of which are not easily controlled. The inherent inability to limit the distribution of digital content has had far-reaching implications on the field of copyright law over the last couple of decades. While certain systems and methods have been developed to control the copying and distribution of such duplicated data, one problem with these systems and methods is that they may be circumvented through the execution of certain types of software in conjunction with these systems and methods, for example, code which modifies the systems and methods, or obtains data utilized by such systems and methods in an unauthorized or unintended manner.

In particular, certain techniques may be utilized to obtain data accessed (e.g., read or written) by such security systems executing on a computer. This data may then be utilized in attempts to circumvent such security systems and thus circumvent the control over the copying and distribution of digital data.

Accordingly, there is a need to find systems and methods by which the data of such security systems may likewise be secured, where by securing such data the effectiveness of such a security system may be enhanced.

SUMMARY

Embodiments of systems and methods for the isolation of the working set of a process executing in a secure mode are disclosed. When embodiments of these systems and methods are utilized an unencumbered generality as well as a level of protection against attack that surpasses many other security systems may be obtained.

In particular, in one embodiment, systems and methods for preventing direct access to data that is used in a particular computation, while nonetheless still allowing the use of that data. In another embodiment, access to data that is used by one software process can be denied to any other software process. Embodiments of these systems and methods for data access control can be used in a large number of potential application areas, including the areas of security which may encompass, but are not limited to, the following: digital security, copyright control, conditional access, protection against undesirable computer viruses, etc. Specifically, embodiments may be utilized in conjunction with a recursive security protocol to augment such a security protocol.

Additionally, embodiments of systems are presented which embody these types of methodologies in computer systems, hardware, and software. It should be noted that the exact same hardware implementation could potentially be used to implement any one or combination of the entire range of solutions, depending on the requirements of the software.

Moreover, embodiments present a simple and easily understood security protocol, made up of three intersecting technology components working together in a unique cooperative framework. The simplicity of the individual components, the complete architectural independence and their low implementation overhead make this system suitable for a wide variety of architectures and deployment scenarios. Embodiments can thus be deployed in simple, low power systems as well as sophisticated, complex high-throughput designs with minimal changes to any pre-existing software.

If implemented as described in embodiments, embodiments of such an approach can be shown to possess "Zero-Knowledge" aspects and thus can be provably secure in the face of well-known attack strategies, such as an Adaptive Chosen-Ciphertext attack. By making the system's Secret Keys architecturally invisible (both directly as well as indirectly) and the by its ability to efficiently and definitively isolate the working set of any secure process from any other process, a correctly implemented Recursive Security system can be shown to be impervious to Replay Attacks and offer an immunity to Return-Oriented Programming exploits that cannot be matched by competing solutions.

Embodiments of a recursive security protocol can also be useful in the fight against malware of all kinds. Due to its "Permission Required to Execute" approach as opposed to the more traditional "Permission to Execute Denied" method (commonly known as a "White-Listing" versus a "Black Listing" scheme) the Recursive Security protocol can be used to prevent unauthorized and/or modified software executables from running on a system of any architecture.

In one embodiment, a process may be executing on a processor in a secure mode and data stored in a line of a cache, wherein the data was stored by the process executed on the processor in the secure mode. Access to such lines of cache may be controlled using a secure descriptor associated with the process such that only the process can access the line of the cache, wherein the secure descriptor is based on a secret key stored in the hardware of the system comprising the processor and the cache. According to some embodiments then, access may be controlled even after the process has terminated.

In some embodiments, the secure mode was entered based on the secure descriptor, an entire working set of the process is stored in the cache and writes to a memory location other than the cache are disabled in the secure mode. Furthermore, the line of the cache may be associated with the secure descriptor associated with the process or a security flag associated with the line of the cache may be set when the process writes the data.

In another embodiment, controlling access to a line of cache may include determining that the line of cache is being accessed by a currently executing process, determining if a currently executing process is executing in secure mode, determining a secure descriptor associated with the currently executing process, comparing the secure descriptor and with the secure descriptor associated with the line and allowing access only if the currently executing process is executing in secure mode and the secure descriptors match.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same components. The invention may be better understood by reference to one or more of these drawings in combination with the description presented herein. It should be noted that the features illustrated in the drawings are not necessarily drawn to scale.

DETAILED DESCRIPTION

Figure 1:
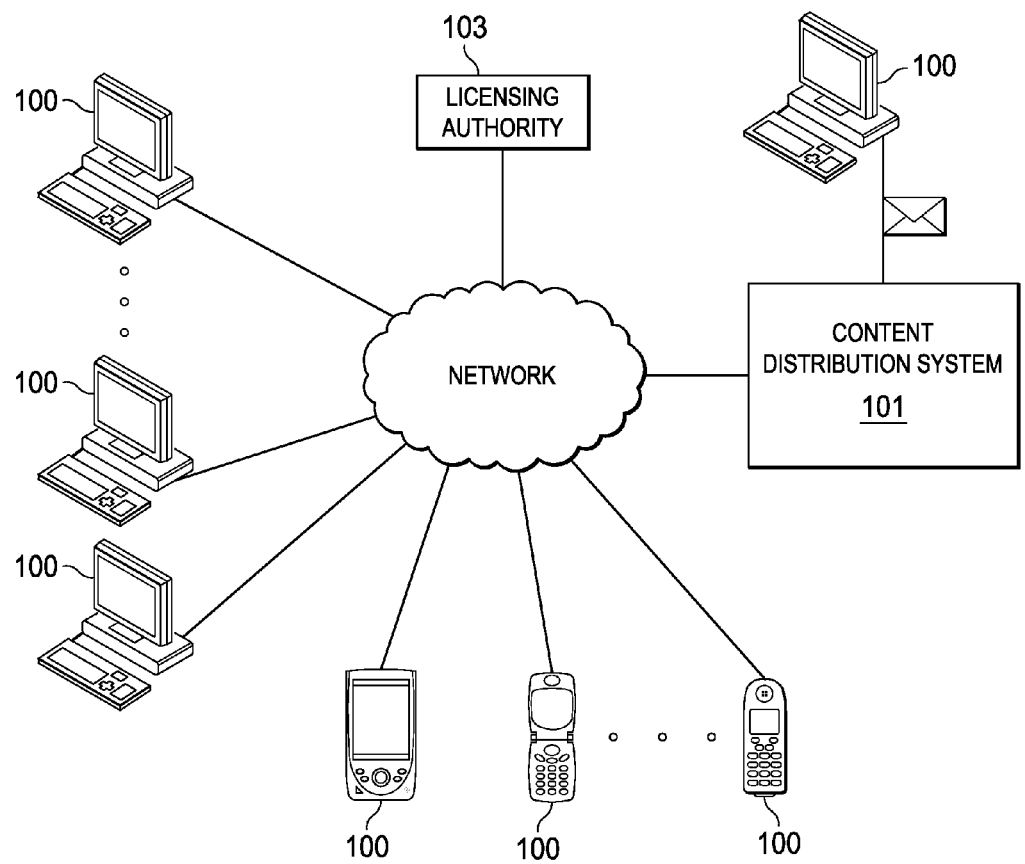
FIG. 1 depicts one embodiment of an architecture for content distribution.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. For example, though embodiments as described herein have been described in conjunction with their implementation in the context of a recursive security system, it will be noted that other embodiments may be usefully applied in other contexts to secure process working sets.

Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Embodiments of the present invention can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, at least one read-only memory ("ROM"), at least one random access memory ("RAM"), at least one hard drive ("HD"), and one or more input/output ("I/O")

device(s). The I/O devices can include a keyboard, monitor, printer, electronic pointing device (for example, mouse, trackball, stylus, etc.), or the like. In embodiments, the computer has access to at least one database over the network.

ROM, RAM, and HD are computer memories for storing computer-executable instructions executable by the CPU or capable of being compiled or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, or any other programming or scripting code. In an embodiment, HTML may utilize JavaScript to provide a means of automation and calculation through coding. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols. In another embodiment, this communication between systems may be effected by using a printed medium, where a user can provide the communicated data to a target "endpoint" system by entering it manually.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols. It will be understood for purposes of this disclosure that a module is one or more computer processes, computing devices or both, configured to perform one or more functions. A module may present one or more interfaces which can be utilized to access these functions. Such interfaces include APIs, web services interfaces presented for a web services, remote procedure calls, remote method invocation, etc.

As discussed above, digital distribution has completely and irrevocably changed the media business, with mixed consequences. Like any technological advance, the transition to digital formats enabled a wealth of new opportunities for the creative arts. In the process, however, this transformation challenged long-held notions of how best to distribute and monetize artistic assets.

One particular problem has to do with the ease of copying digital data. Forgeries have been a problem for as long as original art has existed, yet creating a convincing copy has historically required a talented artisan (i.e., an expert forger).

The digital revolution changed the rules in two remarkable aspects. First, copies of a digital work can be exact duplicates—indistinguishable from "originals". Thus, there may be no practical way to differentiate between "authentic" and "illegitimate" copies of a digital work. The second change is that exact duplicate copies can be created virtually at will by anyone, at vanishingly low cost.

These two aspects produce unprecedented opportunity for distributing genuine as well as illicit copies of digital works. Historically, the value of works has been closely, if not inextricably, tied to physical objects. In the digital world, however, the ability to globally deliver a work with negligible cost per copy has changed the dynamic, both for copyright holders and those who would profit from the unauthorized distribution of the works.

Enter Digital Rights Management (DRM). One goal of a successful DRM system is to prevent dissemination of copies of digital works in an "unlicensed" manner. This strategy matches the historical linkage between a physical object and a work. In the digital age, this strategy is flawed for many reasons yet this "copy control" approach remains the premise upon which the vast majority of DRM systems are built.

In the case of digital data distribution, copying the "controlled" data happens when it is distributed. The data that originates at the distribution point may go through quite a few intermediaries before it ends up at its intended playback device(s). Each intermediate device could potentially make an exact duplicate copy of the entire data stream as it passes through. Thus, attempts to limit "copying" globally distributed digital data may be essentially meaningless. In many cases, distributed digital data can always be copied.

However, an encrypted version of digital data typically bears little resemblance to the original. The ability to decrypt the data may be mediated by a single (usually global) key that according to embodiments remains secret.

In effect, possessing the global key is the equivalent of possessing the copyrighted work. Thus, if the encryption process is performed correctly, theoretically nothing should prevent free distribution of any number of copies of the encrypted version of any given copyrighted work.

In fact, the relevant problem becomes control of the decryption process itself, (and of the global encryption key), rather than copy prevention.

In this way, we can distill the problem of digital distribution down to one of control over the secret key rather than control over the (typically much larger) encrypted data set. It should be noted that, as a given data set grows in size, the more difficult it is to hide, or at least to maintain control over. Of course, as the size of the secret key decreases, then the easier it is to guess the value of that key. Thus, the correct tradeoff for a successful security system is to optimize the size of the secret key such that it is as small as possible, and yet it is not so small that it is easily guessed.

Another concern is that of whether or not to globally encrypt a distributed data set (which can then be freely shared, as we discussed earlier) or to distribute multiple individual encrypted copies of this same data set, where each of the designated authorized recipients is given an individually encrypted copy. Aside from the obvious inefficiency of such a scheme, it is in most cases actually a less secure strategy than to perform a single "global" encryption (with an associated "global" encryption key) and to just distribute the singly (and globally) encrypted data set. This is due to the fact that the encrypted data sets will all have a common plaintext source, with common statistics that can be analyzed in order to provide a wealth of additional information regarding the value of the secret keys used in the encryption process. So the correct strategy in most cases is to perform a single encryption (with a single global secret key) and to distribute only the globally encrypted data set.

Assume for the moment that it was managed to successfully and securely transmit an "authorized" copy of a global secret key to a legitimate customer. The issue then becomes one of how to keep that customer from sharing this same global key with other, potentially unauthorized entities. Thus, it may be desired to define some way of managing the authorized global decryption keys even after they are in the possession of legitimate owners of these keys. Furthermore, once the global key has been used to decrypt a legitimate copy of the encrypted data set, one may also consider the problem of how to keep the authorized owner of a decrypted data set from re-distributing that decrypted data set to others in an unauthorized manner.

Thus, is desired that the security "envelope" should extend the boundaries of the control mechanism beyond just the decryption process. If even one correctly decrypted, but otherwise "uncontrolled" digital copy is created, that uncontrolled copy can be digitally duplicated without limit. Once the "digital genie" is freed, it can never be put back into the bottle. Thus, to truly control data (copyrighted or otherwise), entities that correctly decrypt encrypted data should be kept from redistributing decrypted versions. It is thus desirable to control both decryption as well as any potential re-distribution in order to achieve the goal of effective control of digital data (e.g., copyrighted data). Notably, in the case where the decryption of a data set and the display of that same data set do not occur in the same device, then there may be a need to protect the transmission link between the decryption device and the display device, since this transmission effectively amounts to a redistribution process. In this case, then, the transmission link should exhibit the same robustness against external observers and interference as the primary means of distribution. Otherwise, prospective attackers may simply target the weaker link.

Certain very effective techniques for effectively maintaining control of data have been developed, including those U.S. Pat. No. 7,203,844, entitled "Recursive Security Protocol System and Method for Digital Copyright Control," issued Apr. 10, 2007, U.S. Pat. No. 7,457,968, entitled "Method and System for a Recursive Security Protocol for Digital Copyright Control," issued Nov. 25, 2008, U.S. Pat. No. 7,747,876, entitled "Method and System for a Recursive Security Protocol for Digital Copyright Control," issued Jun. 29, 2010, U.S. patent application Ser. No. 12/615,843, entitled "Method and System for Control of Code execution on a General Purpose Computing Device and Control of Code Execution in an Recursive Security Protocol," filed Nov. 10, 2009, U.S. patent application Ser. No. 12/788,516, entitled "Method and System for a Recursive Security Protocol for Digital Copyright Control," filed May 27, 2010, and U.S. patent application Ser. No. 13/745,236, entitled "Method and System for a Recursive Security Protocol for Digital Copyright Control," filed Jan. 18, 2013, which are hereby incorporated by reference in their entirety for all purposes. These techniques may be effectively used to maintain control over virtually any type of data in conjunction with, for example, DRM, copyright protection or other types of control.

From a review of the above applications and patents, it can be realized that embodiments of such techniques may utilize compound encryption to encode digital data. In one embodiment of compound encryption, no single key (e.g., a global key) can correctly decode an encoded data set by itself. Each key must be combined with at least one other key to construct a compound key. For convenience, the original individual keys of which a compound key is comprised are referred to as precursor keys. Although any compound key may be constructed by combining at least two precursor keys it can be seen that, given a minimally bipartite compound key, a single compound key may in fact be based on any number of precursor keys. We will discuss how this is accomplished below.

It should be noted that, in one embodiment, if at least one of the precursor keys in this entire chain is considered as "secret," then any of the other precursor keys may then potentially be public data, and may thus either be published or not, depending on the needs and architecture of the overall security system. It can be shown that, as long as there is at least one secret precursor key in a given compound key's chain of construction, then the overall security of the compound-key based system can essentially be conditioned on the security of that single secret precursor key.

Figure 15:
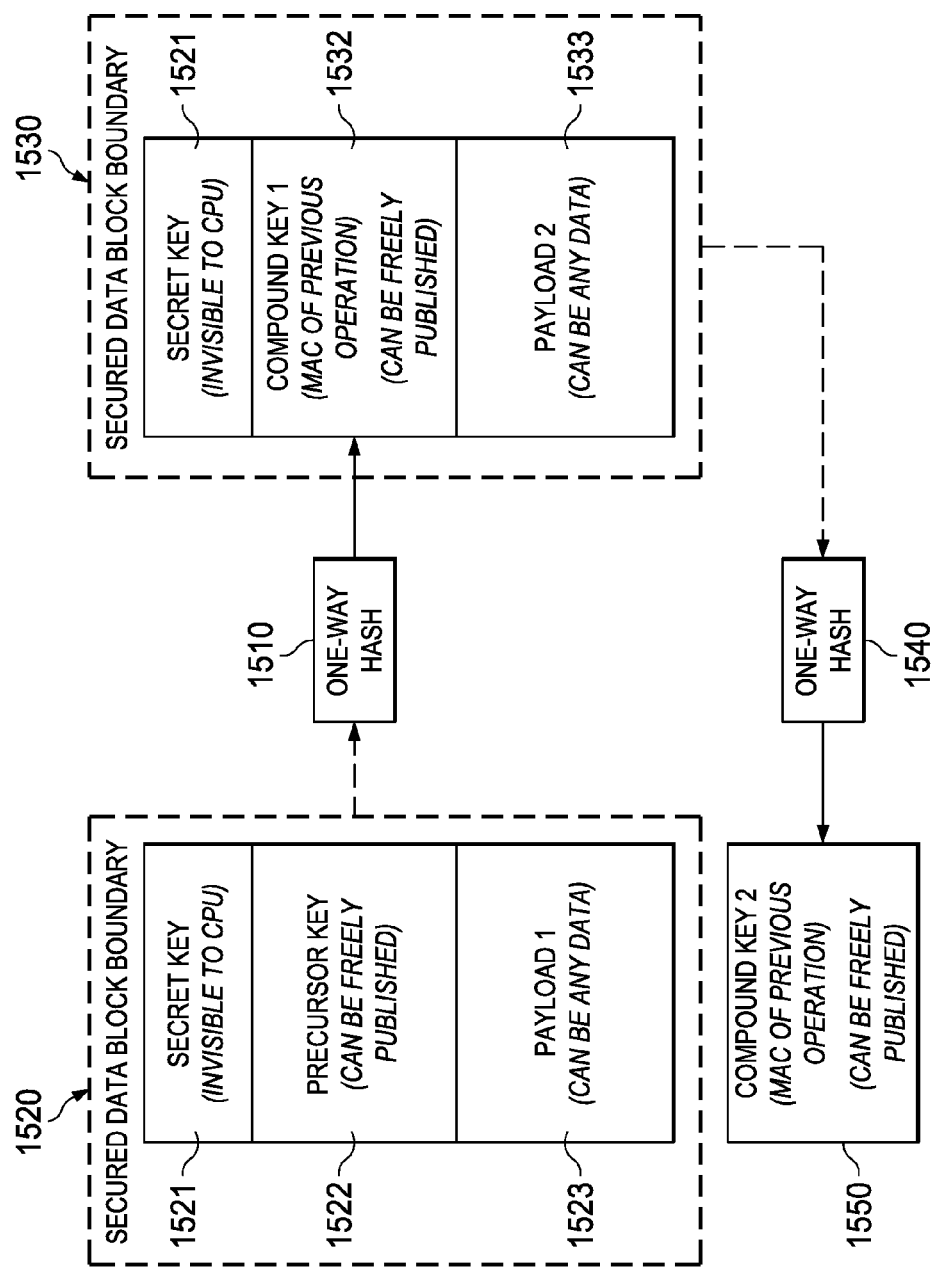
FIG. 15 depicts an embodiment of compound key generation.

There are multiple methods to create a compound key, but two such mechanisms are given by way of example: one-way and reversible. Examples of the first method is shown in FIG. 15. In the one-way method, a compound key may be generated by a secure one-way hash function. In this example, a compound key can be generated by concatenating at least two precursor keys and passing the resultant concatenated data set through a one-way hash function. The one-way property of the hash function makes this kind of transformation irreversible. That means there is no practical way to recreate the value of any of the precursor keys from the resulting compound key. A second attribute of a one-way hash function is that it may include a built-in data compression function. Thus, no matter how long the input data set (e.g., the precursor keys may be of any arbitrary length), the resulting output (the compound key) will have a fixed length.

Recalling the discussion earlier that a compound key may have more than two precursors, it can thus be shown that generate a single compound key can be generated with an arbitrarily large set of precursor key input data. This can be accomplished by a "cascading" or "chaining" process, where a first compound key is constructed and then this first compound key is used as one of the precursor keys to a second compound key.

Since the output of such a one-way compound key generation process may be of fixed length, this property can be taken advantage of in a number of ways. First, the one-way compound key procedure can be generalized such that none of the precursor key inputs must be of a fixed length. However, in the case where the assumption is made that one of the precursor keys (for example, the secret precursor key) is of a fixed length, then one can further assign that fixed length precursor key to carry the secret key value (upon which the overall security of the system depends).

Thus, according to embodiments one can ensure the overall security of a system consisting of an arbitrarily large set of input data (e.g., precursors) simply and efficiently using a single, relatively small, fixed length register that can implemented by, for example, a simple one time-programmable register structure. As was stated earlier, this is effectively the goal of a successful security system; that of condensing the requisite secret knowledge down to a minimum size; as long as that minimum size is sufficiently large to prevent it from being easily guessed.

It should be noted that, even in the case where the secret precursor key is fixed to a relatively small (and easily implemented) 128-bit, 256-bit, 512-bit, etc. value, for example, the time taken, on average, to correctly guess such a secret key will nonetheless still be quite long.

Figure 16:
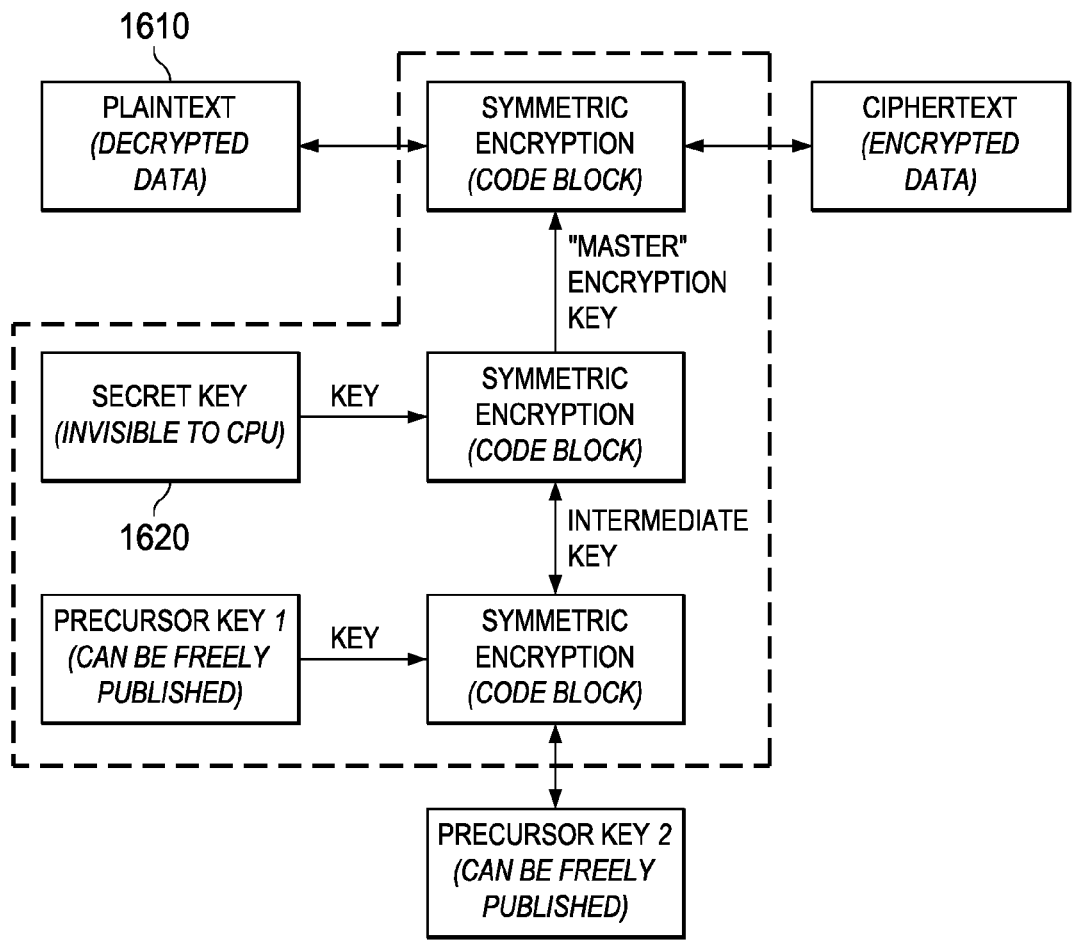
FIG. 16 depicts an embodiment of compound key generation.

In some cases, however, it is desirable to be able to "reverse" the compound key in order to regenerate a precursor key value. In that situation, we can use a slightly different mechanism in order to create a "reversible compound key". One example of how we might construct such a reversible compound key is shown in FIG. 16. Of course, it should be realized there are a number of methods by which this could be accomplished, and the example shown in FIG. 16 is simply one such example. The common feature of such a structure, however, may be that there are at least two "precursor" inputs. Here, these are shown as the plaintext 1610 and the key 1620, which correspond to the two precursors (e.g., the secret key precursor and the public key precursor) of the one-way compound key structure that we discussed earlier. Thus, as with the one-way compound key, the reversible compound key may be created using at least two precursors. Also, as discussed, the construction can be generalized into a "cascaded" or "chained" compound key structure, where a final compound structure is dependent on any number of precursor inputs. One example of how to create such a "cascaded" reversible compound key is also shown in FIG. 16.

Also as before, if the key precursor is kept secret, then there is no practical way to guess either of the precursors' original values from the resultant output, nor is there a practical means to correctly predict the value of the encrypted output, even if the non-secret precursor (e.g., in the example shown in FIG. 16, plaintext 1610) input is known. Thus once again, the overall security is conditioned on the ability of the system to keep only the secret key value under control.

Using a reversible method to create the compound key, the original value of a first precursor can be reconstructed by running through the symmetric encryption function again. Note that this reversal process is only possible as long as the encryption function may access the same precursor used to create the second compound key in the first place.

An interesting aspect of the compound encryption is that any numeric value can be a precursor. This flexibility allows a recursive security system to produce single compound key values that correspond to very complex logical structures (and are therefore dependent on an arbitrarily large number of diverse components) in a simple and remarkably efficient manner. In all cases, however, the value of any a key in a given cryptographic structure is provably secure against discovery (assuming the intractability of the underlying cryptographic function) from the resulting compound key alone.

In addition to the symmetric encryption as discussed, one could also construct a reversible compound key using an asymmetric encryption mechanism. In that case, the reversible compound key may then be used as a digital signature resulting from the "seeding" of the hash function with the secret precursor key and one of a public-private key set. Such a construction could then be used for signing digital documents in a secure manner on a given platform. In other words, one could only generate a correctly verifiable digital signature while using a specific computer platform or while in a specific geographic location—or some combination of any input parameter that may be represented in digital form.

Accordingly, in embodiments of hardware devices (e.g., target devices) that implement recursive security at least one of the precursors for any compound key operation that executes on that system should be securely stored on the actual device. Thus, according to some embodiments one precursor for compound key operation may be a secret key stored in the hardware of the target device. Such a hardware secret key may, in many cases, serve as a part of the root of a "Chain of Trust" of such a recursive security system. In other embodiments, other aspects of the system could also be a part in this hardware "Chain of Trust". Such aspects could include the secure one-way hash function, a one-time-programmable serial number register (which could be architecturally visible) or even some parametric property of the silicon die itself, such as a threshold voltage versus temperature curve or some value that is only observable when the chip in question is put into Scan/Test mode, for example. Using this mechanism, a particular chip could be distinctly and individually differentiated from an otherwise functionally identical device.

As is described in the above referenced patents and applications, and as will also be described herein, such a secret key may only be accessible when a processor of a target device is operating in a secure execution mode (also referred to as secured mode). Thus, a process executing in secure mode on such a target device may have access to the secret key and may generate data based on this secret key.

In such a system, in certain embodiments it may potentially be desirable to further isolate the secret key in such a way that its value cannot be exposed, even unintentionally, even though its value may be used in an unspecified calculation. One such means of accomplishing this goal is to use the output of a one-way secure hash function on the secret key and some other datum instead of using the secret key value directly in the unspecified calculation reference earlier. If the one-way function is chosen correctly, then the output of the unspecified calculation is completely deterministic but nonetheless not practically predictable without prior knowledge of the value of the secret key. Thus, a system could be constructed that would make use of a secret key, but nonetheless be unable to expose its value computationally.

However, in some calculations, it may be desirable to use a secret key (or some derivative thereof) in a calculation that may potentially expose some other secret; either if the calculation's operation is halted prior to completion or if some intermediate result of such calculation is exposed to an outside observer. As such, in addition to controlling the execution of code on such a target device in order to maintain the security it may also be desirable to isolate the working set (e.g., the data read or written from memory such as cache, main memory, registers, etc.) of any processes executing in secure mode on the target device. More specifically, for example, if such a security system is separable from the target device itself, and intermediate results observable during a decryption process, then such a security system may be vulnerable to man in the middle attacks and differential cryptanalysis. This is due to the fact that the partial result of an otherwise invalid operation may provide a window into what would be an otherwise opaque "black-box" based system. In other words, working backwards from a working set of a process, it may be possible to discover a derivative value of the secret key that is being used by the secure process and thus compromising the chain of trust of the security system.

Thus, there is a need for methods and systems which may control the access to working set of a process on a target device and in particular that data read or written during the operation of a process executing in secure mode remain unreadable by any other code segment, either while the code segment is in the process of running or even after the original code segment has terminated. In particular, it may be desired to unambiguously isolate data that belongs to one instance of a process from any other process.

To that end, attention is now directed to embodiments of systems and methods for process working set isolation. Generally, embodiments of such systems and methods may isolate the working set of a process executing in secure mode such that the data is inaccessible to any other process, even after the original process terminates. More specifically, in one embodiment, the entire working set of a currently executing process may be stored in cache (e.g., an on-chip cache) and off-chip writes and write-through of that cache disallowed when executing in secured mode. Additionally, for any of those cache lines that are written to while in secure mode (e.g., a "dirty" cache line) those cache lines may be associated with a secure descriptor for the currently executing process. The secure descriptor may uniquely specify those associated "dirty" cache lines as belonging to the executing secure process, such that access to those cache lines can be restricted to only that process.

In one embodiment, to ensure that the secure descriptor is sufficiently unique to not only distinguish between different processes (including different instantiations of the same code segment that are called at different times), the secure descriptor may be a compound key. A compound key may be produced for use as a secure process descriptor using the target device's secret key. As discussed above a compound key may be produced without comprising the target device's secret key. As, in certain embodiments a dedicated hash functional block is provided in the target device, the output of such a hash block (or a secure execution controller comprising the hash block) may be used to create these secure process descriptors using the secret key of the target device.

Furthermore, in certain embodiments the output of this hash function may be used to compare such a generated secure process descriptors (which may be generated automatically) with an architecturally-visible secure process descriptor in order to determine whether or not there is a match between the values without exposing the actual value of the generated secure process descriptor to an external attacker.

Also, additional values may also be used in conjunction with the target device's secret key in the evaluation of the one-way hash function in order to produce this secure descriptor. Such additional values may or may not be visible to the processor without compromising the value of the secret key. Some examples of these additional values might include a timestamp, a process ID, the previously-calculated result of the hash function or any other attribute that can be represented in digital form.

In addition, in certain embodiments, the size of these additional values can be completely arbitrary. In a system where the one-way hash function has a built-in compression attribute, then the resulting output of the hash function will be of fixed length, thus allowing the result of an arbitrarily large number of iterations through the hash function to remain fixed in size, no matter how many hash function iterations are employed. In this manner, the secure process descriptor may include information regarding the time of execution of the secure process, as well as the entire calling chain of the secure process in question. Thus, any one secure process may be efficiently and effectively isolated from any other secure process, even if the two processes are exactly the same, but simply called at different times or by different "parent" processes, for example.

In certain embodiments, in the event that the working set for a secure process overflows the on-chip cache, and portions of that cache that include those dirty lines associated with the secure process descriptor need to be written to main memory (e.g., a page swap or page out operation) external data transactions between the processor and the bus (e.g., an external memory bus) may be encrypted. The key for such an encryption may be the secure descriptor itself or some derivative value thereof, for example, the output of the hash function with the secure process descriptor and the secret key.

Another possibility for such an encryption key might be an encrypted version of the secure process descriptor. The encryption key used in this latter case may be the output of the hash function of the secret key concatenated with the current secure process descriptor and some other value. This latter value could then be published (e.g., written out to memory in the clear). In that case, then only the secure process that actually generated the data that was encrypted and then subsequently written out to memory in the first place could regenerate the correct decryption key and thus, restore the original data as it is read from memory back into the data cache. This is one means by which a secure process may be able to be interrupted (and have its working set swapped out of the data cache) and then resumed later in a secure manner.

A derivative of this same scheme may be used in order to pass data securely from one secure process to another process, even if the two processes have different secure process descriptors. In that case, then there are at least two options; read-only access for the recipient secure process to the shared data or read-write access to the shared data. In either case, the two processes should communicate a shared secret decryption key between one and the each other. In the case where the shared secret decryption key is generated by a reversible compound key process, then the shared data may be writeable by the secure process that is the recipient of the shared data. In the case where the shared key is based on a one-way compound key mechanism, then the shared data may be limited to read-only access for the recipient.

To enhance performance, in certain cases where a secure process may have a large working set or is frequently interrupted (e.g., entailing many page swaps) a subset of the processes working set that is considered "secure" may be created (e.g., only a subset of the dirty cache lines for the process may be associated with the secure descriptor) and only encrypt those cache lines or the portion of the cache containing those lines, when it is written out to external memory.

Additionally, to enhance performance, an off-chip storage mechanism (e.g., a page swapping module) can be run asynchronously in parallel with an interrupting process (e.g., using a DMA unit with integrated AES encryption hardware acceleration) and thus, could be designed to have a minimal impact on the processor performance. In another embodiment, a separate secure "working set encapsulation" module may be used to perform the encryption prior to allowing working set data to be written out to memory.

Using embodiments presented herein, then, by making the system's secret keys architecturally invisible (either directly or indirectly) and by virtue of the ability to efficiently and definitively isolate the working set of a secure process from any other process, recursive security devices may be made substantially impervious to replay attacks and offer an immunity to return-oriented, or other, programming exploits, that cannot be matched in competing solutions. As such, these recursive security systems may provide a number of advantages relative to the implementation of security using obfuscation alone.

Before discussing embodiments in more detail, it may be helpful to give a general overview of an architecture in which embodiments of the present invention may be effectively utilized. FIG. 1 depicts one embodiment of such a topology. Here, a content distribution system 101 may operate to distribute digital content (which may be for example, a bitstream comprising audio or video data, a software application, etc.) to one or more target units 100 (also referred to herein as target or endpoint devices) which comprise protocol engines. These target units may be part of, for example, computing devices on a wireline or wireless network or a computer device which is not networked, such computing devices including, for example, a personal computers, cellular phones, personal data assistants, media players which may play content delivered as a bitstream over a network or on a computer readable storage media that may be delivered, for example, through the mail, etc. This digital content may compose or be distributed in such a manner such that control over the execution of the digital content may be controlled and security implemented with respect to the digital content.

In certain embodiments, control over the digital content may be exercised in conjunction with a licensing authority 103. This licensing authority 103 (which may be referred to as a central licensing authority, though it will be understood that such a licensing authority need not be centralized and whose function may be distributed, or whose function may be accomplished by content distribution system 101, manual distribution of data on a hardware device such as a memory stick, etc.) may provide a key or authorization code. This key may be a compound key (DS), that is both cryptographically dependent on the digital content distributed to the target device and bound to each target device (TDn). In one example, a target device may be attempting to execute an application in secure mode. This secure application (which may be referred to as candidate code or a candidate code block (e.g., CC)) may be used in order to access certain digital content.

Accordingly, to enable a candidate code block to run in secure mode on the processor of a particular target device 100 to which the candidate code block is distributed, the licensing authority 103 must supply a correct value of a compound key (one example of which may be referred to as an Authorization Code) to the target device on which the candidate code block is attempting to execute in secure mode (e.g., supply DS1 to TD1). No other target device (e.g., TDn, where TDn≠TD1) can run the candidate code block correctly with the compound key (e.g., DS1) and no other compound key (DSn assuming DSn≠DS1) will work correctly with that candidate code block on that target device 100 (e.g., TD1).

As will be described in more detail later on herein, when Target Device 100 (e.g., TD1) loads the candidate code block (e.g., CC1) into its instruction cache (and, for example, if CC1 is identified as code that is intended to be run in secure mode), the target device 100 (e.g., TD1) engages a hash function (which may be hardware based) that creates a message digest (e.g., MD1) of that candidate code block (e.g., CC1). The seed value for this hash function is the secret key for the target device 100 (e.g., TD1's secret key (e.g., SK1)).

In fact, such a message digest (e.g., MD1) may be a Message Authentication Code (MAC) as well as a compound key, since the hash function result depends on the seed value of the hash, the secret key of the target device 100 (e.g., SK1). Thus, the resulting value of the message digest (e.g., MD1) is cryptographically bound to both the secret key of the target device 100 and to the candidate code block. If the licensing authority distributed compound key (e.g., DS1) matches the value of the message digest (e.g., MD1) it can be assured that the candidate code block (e.g., CC1) is both unaltered as well as authorized to run in secure mode on the target device 100 (e.g., TD1). The target device 100 can then run the candidate code block in secure mode.

As can be seen then, in one embodiment, when secure mode execution for a target device 100 is performed the target device 100 may be executing code that has both been verified as unaltered from its original form, and is cryptographically "bound" to the target device 100 on which it is executing. This method of ensuring secure mode execution of a target device may be contrasted with other systems, where a processor enters secure mode upon hardware reset and then may execute in a hypervisor mode or the like in order to establish a root-of-trust.

Accordingly, using embodiments as disclosed, any or all of these data such as the compound key from the licensing authority, the message digest, the candidate code block, etc. (e.g., DS1, MD1, CC1) may be completely public as longs as the secret key for the target device 100 (e.g. SK1) is not exposed. Thus, it is desired that the value of the secret key of a target device is never exposed, either directly or indirectly. Accordingly, as discussed above, embodiments of the systems and methods presented herein, may, in addition to protecting the secret key from direct exposure, protect against indirect exposure of the secret key on target devices 100 by securing the working sets of processes executing in secure mode on target devices 100.

Figure 2:
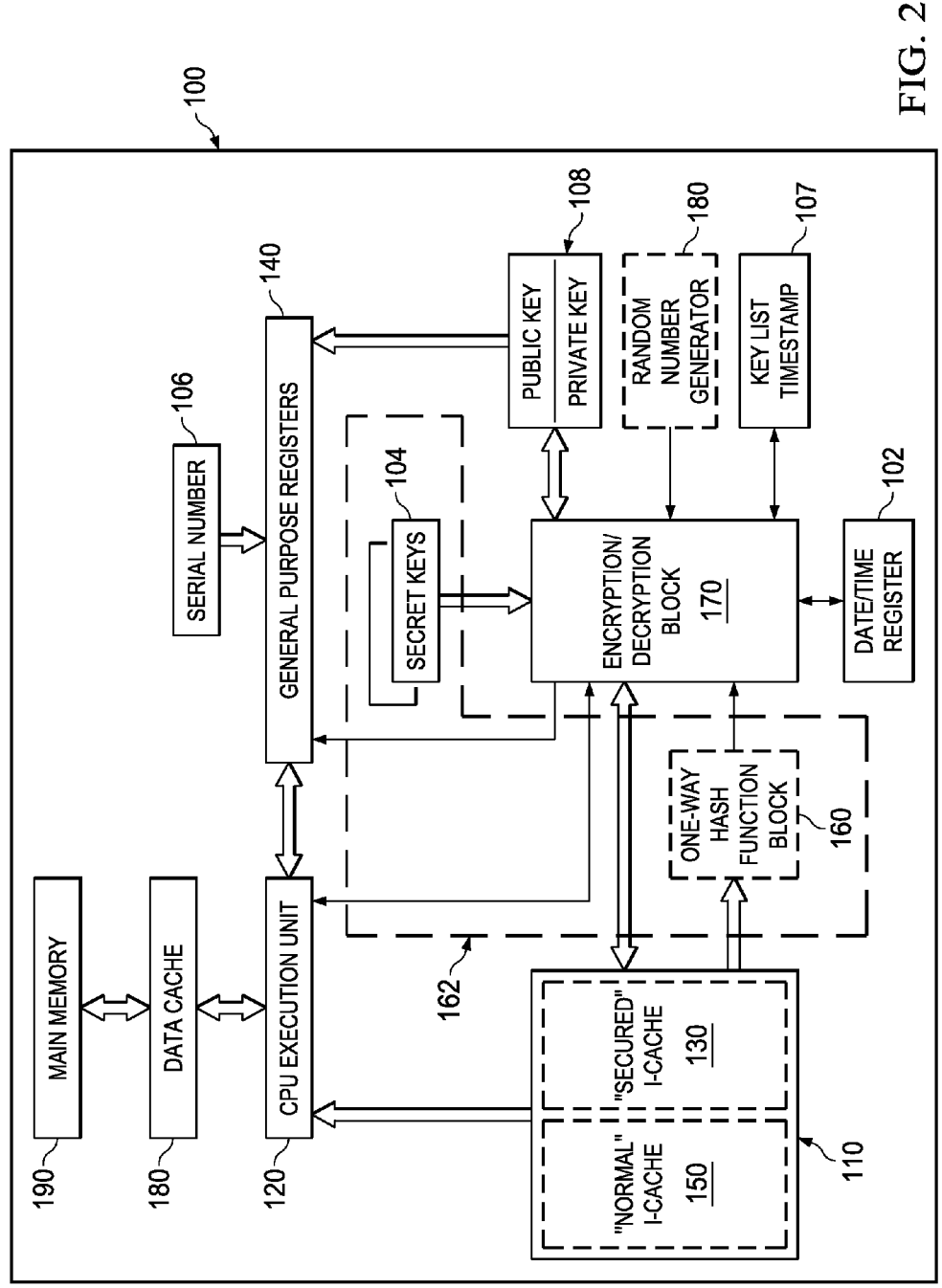
FIG. 2 depicts one embodiment of a target device.

Moving now to FIG. 2, an architecture of one embodiment of a target device that is capable of controlling the execution of the digital content or implementing security protocols in conjunction with received digital content. Elements of the target unit may include a set of blocks, which allow a process to execute in a secured mode on the target device such that when a process is executing in secured mode the working set of the process may be isolated. It will be noted that while these blocks are described as hardware in this embodiment, software may be utilized to accomplish similar functionality with equal efficacy. It will also be noted that while certain embodiments may include all the blocks described herein other embodiments may utilize lesser or additional blocks.

The target device 100 may comprise a CPU execution unit 120 which may be a processor core with an execution unit and instruction pipeline. Clock or date/time register 102 may be a free-running timer that is capable of being set or reset by a secure interaction with a central server. Since the time may be established by conducting a query of a secure time standard, it may be convenient to have this function be on-chip. Another example of such a date/time register may be a register whose value does not necessarily increment in a monotonic manner, but whose value does not repeat very often. Such a register could be useful in the case where a unique timestamp value might be required for a particular reason, but that timestamp value could not necessarily be predicted ahead of time. Thus, a pseudo-random number generator may be a suitable mechanism for implementing such a register. Another option for implementing such a function would be to use the output of a hardware hash function 160 to produce the current value of this register. In the case where the output of such a hash function is used as a seed or salt value for the input of the hash function, the resulting output series may resemble a random number sequence statistically, but the values may nonetheless be deterministic, and thus, potentially predictable. Target unit 100 may also contain a true random number generator 182 which may be configured to produce a sequence of sufficiently random numbers or which can then be used to supply seed values for a pseudo-random number generation system. This pseudo-random number generator can also potentially be implemented in hardware, software or in "secure" software.

One-way hash function block 160 may be operable for implementing a hashing function substantially in hardware. One-way hash function block 160 may be a part of a secure execution controller 162 that may be used to control the placement of the target device 100 in secure mode or that may be used to control memory accesses (e.g., when the target device 100 is executing in secured mode), as will be described in more detail herein at a later point.

In one embodiment, one way has function block 160 may be implemented in a virtual fashion, by a secure process running on the very same CPU that is used to evaluate whether a given process is secure or not. In certain embodiments two conditions may be adhered to, ensuring that such a system may resolve correctly. First, the secure mode "evaluation" operation (e.g., the hash function) proceeds independently of the execution of the secure process that it is evaluating. Second, a chain of nested evaluations may have a definitive termination point (which may be referred to as the root of the "chain of trust" or simply the "root of trust"). In such embodiments, this "root of trust" may be the minimum portion of the system that should be implemented in some non-changeable fashion (e.g., in hardware). This minimum feature may be referred to as a "hardware root of trust". For example, in such embodiments, one such hardware root of trust might be a One-Way hash function that is realized in firmware (e.g., in non-changeable software).

Another portion of the target unit 100 may be a hardware-assisted encryption/decryption block 170 (which may be referred to as the encryption system or block, the decryption system or block or the encryption/decryption block interchangeably), which may use either the target unit's 100 secret key(s) or public/private keys 108 (described later) or a derivative thereof, as described earlier. This encryption/decryption block 170 can be implemented in a number of ways. It should also be noted that such a combination of a One-Way Hash Function and a subsequent encryption/decryption system may comprise a digital signature generator that can be used for the validation of any digital data, whether that data is distributed in encrypted or in plaintext form. The speed and the security of the entire protocol may vary depending on the construction of this block, so it may be configured to be both flexible enough to accommodate security system updates as well as fast enough to allow the system to perform real-time decryption of time-critical messages.

It is not material to embodiments exactly which encryption algorithm is used for this hardware block 170. In order to promote the maximum flexibility, it is assumed that the actual hardware is general-purpose enough to be used in a non-algorithmically specific manner, but there are many different means by which this mechanism can be implemented. It should be noted at this point that the terms encryption and decryption will be utilized interchangeably herein when referring to engines (algorithms, hardware, software, etc.) for performing encryption/decryption. As will be realized if symmetric encryption is used in certain embodiments, the same or similar encryption or decryption engine may be utilized for both encryption and decryption. In the case of an asymmetric mechanism, the encryption and decryption functions may or may not be substantially similar, even though the keys may be different.

Target device 100 may also comprise a data cache 180, an instruction cache 110 where code that is to be executed can be stored, and main memory 190. Data cache 180 may be almost any type of cache desired such as a L1 or L2 cache. In one embodiment, data cache 180 may be configured to associate a secure process descriptor with one or more pages of the cache and may have one or more security flags associated with (all or some subset of the) lines of a data cache 180. For example, a secure process descriptor may be associated with a page of data cache 180.

Generally, embodiments of target device 100 may isolate the working set of a process executing in secure mode stored in data cache 180 such that the data is inaccessible to any other process, even after the original process terminates. More specifically, in one embodiment, the entire working set of a currently executing may be stored in data cache 180 and writes to main memory 190 and write-through of that cache (e.g., to main memory 190) disallowed (e.g., by secured execution controller 162) when executing in secured mode.

Additionally, for any of those lines of data cache 180 that are written to while executing in secure mode (e.g., a "dirty" cache line) those cache lines (or the page that comprises those cache lines) may be associated with a secure process descriptor for the currently executing process. The secure process descriptor may uniquely specify those associated "dirty" cache lines as belonging to the executing secure process, such that access to those cache lines can be restricted to only that process (e.g. be by secured execution controller 162).

In certain embodiments, in the event that the working set for a secure process overflows data cache 180 and portions of data cache 180 that include those dirty lines associated with the security descriptor of the currently executing process need to be written to main memory (e.g., a page swap or page out operation) external data transactions between the processor and the bus (e.g., an external memory bus) may be encrypted (e.g., using encryption block 170 or encryption software executing in secure mode). The encryption (and decryption) of data written to main memory may be controlled by secure execution controller 162.

The key for such an encryption may be the secure process descriptor itself or some derivative thereof and that secure descriptor may itself be encrypted (e.g., using the target device's 100 secret key 104 or some derivative thereof) and stored in the main memory 190 in encrypted form as a part of the data being written to main memory.

Instruction cache 110 is typically known as an I-Cache. In some embodiments, a characteristic of portions of this I-Cache 110 is that the data contained within certain blocks be readable only by CPU execution unit 120. In other words, this particular block of I-Cache 130 is execute-only and may not be read from, nor written to, by any executing software. This block of I-Cache 130 will also be referred to as the "secured I-Cache" 130 herein. The manner by which code to be executed is stored in this secured I-Cache block 130 may be by way of another block which may or may not be depicted. Normal I-Cache 150 may be utilized to store code that is to be executed normally as is known in the art.

Additionally, in some embodiments, certain blocks may be used to accelerate the operation of a secure code block. Accordingly, a set of CPU registers 140 may be designated to only be accessible while the CPU 120 is executing secure code or which are cleared upon completion of execution of the secure code block (instructions in the secured I-cache block 130 executing in secured mode), or if, for some reason a jump to any section of code which is located in the non-secure or "normal" I-Cache 150 or other area occurs during the execution of code stored in the secured I-Cache 130.

In one embodiment, CPU execution unit 120 may be configured to track which registers 140 are read from or written to while executing the code stored in secured I-cache block 130 and then automatically clear or disable access to these registers upon exiting the "secured execution" mode. This allows the secured code to quickly "clean-up" after itself such that only data that is permitted to be shared between two kinds of code blocks is kept intact. Another possibility is that an author of code to be executed in the secured code block 130 can explicitly identify which registers 140 are to be cleared or disabled. In the case where a secure code block is interrupted and then resumed, then these disabled registers may potentially be re-enabled if it can be determined that the secure code that is being resumed has not been tampered with during the time that it was suspended.

In one embodiment, to deal with the "leaking" of data stored in registers 140 between secure and non-secure code segments a set of registers 140 which are to be used only when the CPU 120 is executing secured code may be identified. In one embodiment this may be accomplished utilizing a version of the register renaming and scoreboarding mechanism, which is practiced in many contemporary CPU designs. In some embodiments, the execution of a code block in secured mode is treated as an atomic action (e.g., it is non-interruptible) which may make this such renaming and scoreboarding easier to implement.

Even though there may seem to be little possibility of the CPU 120 executing a mixture of "secured" code block (code from the secured I-Cache 130) and "unsecured code" (code in another location such as normal I-cache 150 or another location in memory), such a situation may arise in the process of switching contexts such as when jumping into interrupt routines, or depending on where the CPU 120 context is stored (most CPU's store the context in main memory, where it is potentially subject to discovery and manipulation by an unsecured code block).

In order to help protect against this eventuality, in one embodiment another method which may be utilized for protecting the results obtained during the execution of a secured code block that is interrupted mid-execution from being exposed to other execution threads within a system is to disable stack pushes while a the target device 100 is operating in secured execution mode. This disabling of stack pushes will mean that a secured code block is thus not interruptible in the sense that, if the secured code block is interrupted prior to its normal completion, it cannot be resumed and therefore must be restarted from the beginning. It should be noted that in certain embodiments if the "secured execution" mode is disabled during a processor interrupt, then the secured code block may also potentially not be able to be restarted unless the entire calling chain is restarted.

Each target unit 100 may also have one or more secret key constants 104; the values of neither of which are software-readable. In one embodiment, the first of these keys (the primary secret key) may be organized as a set of secret keys, of which only one is readable at any particular time. If the "ownership" of a unit is changed (for example, the equipment containing the protocol engine is sold or its ownership is otherwise transferred), then the currently active primary secret key may be "cleared" or overwritten by a different value. This value can either be transferred to the unit in a secure manner or it can be already stored in the unit in such a manner that it is only used when this first key is cleared. In effect, this is equivalent to issuing a new primary secret key to that particular unit when its ownership is changed or if there is some other reason for such a change (such as a compromised key). A secondary secret key may be utilized with the target unit 100 itself. Since the CPU 120 of the target unit 100 cannot ever access the values of either the primary or the secondary secret keys, in some sense, the target unit 100 does not even "know" its own secret keys 104. These keys are only stored and used within the security execution controller 162 of the target unit 100 as will be described.

In another embodiment, the two keys may be constructed as a list of "paired" keys, where one such key is implemented as a one-time-programmable register and the other key in the pair is implemented using a re-writeable register. In this embodiment, the re-writeable register may be initialized to a known value (e.g., zero) and the only option that may be available for the system to execute in secure mode in that state may be to write a value into the re-writeable portion of the register. Once the value in this re-writeable register is initialized with some value (e.g., one that may only be known by the Licensing Authority, for example), then the system may only then be able to execute more general purpose code while in secure mode. If this re-writeable value should be re-initialized for some reason, then the use of a new value each time this register is written may provide increased security in the face of potential replay attacks.

Yet another set of keys may operate as part of a temporary public/private key system (also known as an asymmetric key system or a PKI system). The keys in this pair may be generated on the fly and may be used for establishing a secure communications link between similar units, without the intervention of a central server. As the security of such a system is typically lower than that of an equivalent key length symmetric key encryption system, these keys may be larger in size than those of the set of secret keys mentioned above. These keys may be used in conjunction with the value that is present in the on-chip timer block in order to guard against "replay attacks", among other things. Since these keys may be generated on the fly, the manner by which they are generated may be dependent on the random number generation system 180 in order to increase the overall system security.

In one embodiment, one method that can be used to affect a change in "ownership" of a particular target unit is to always use the primary secret key as a compound key in conjunction with another key 107, which we will refer to as a timestamp or timestamp value, as the value of this key may be changed (in other words may have different values at different times), and may not necessarily reflect the current time of day. This timestamp value itself may or may not be itself architecturally visible (e.g., it may not necessarily be a secret key), but nonetheless it will not be able to be modified unless the target unit 100 is operating in secured execution mode. In such a case, the consistent use of the timestamp value as a component of a compound key whenever the primary secret is used can produce essentially the same effect as if the primary secret key had been switched to a separate value, thus effectively allowing a "change of ownership" of a particular target endpoint unit without having to modify the primary secret key itself.

As may be understood then, target device may use secure execution controller 162 and data cache 180 to isolate the working sets of processes executing in secure mode such that the data is inaccessible to any other process, even after the original process terminates. This working set isolation may be accomplished in certain embodiments by disabling off-chip writes and write-through of data cache when executing in secured mode, associating lines of the data cache written by the executing process with a secure descriptor (that may be uniquely associated with the executing process) and restricting access to those cache lines to only that process using the secure process descriptor. Such a secure process descriptor may be a compound key such as an authorization code or some derivative value thereof.

When it is desired to access data in the data cache by the process the secure descriptor associated with the currently executing process may be compared with the secure descriptor associated with the requested line of the data cache. If the secure descriptors match, the data of that cache line may be provided to the executing process while if the secure descriptors do not match the data may not be provide and another action may be taken.

Moreover, in certain embodiments, in the event that the working set for a secure process overflows the on-chip cache, and portions of cache that include those dirty lines associated with the secure process descriptor need to be written to main memory (e.g., a page swap or page out operation) external data transactions between the processor and the bus (e.g., an external memory bus) may be encrypted. The key for such an encryption may be the secure process descriptor itself or some derivative thereof and that secure process descriptor may be encrypted (e.g., using the target device's secret key or some derivative thereof) prior to being written out to the main memory. Again, this encryption processes may be accomplished substantially using the hashing block of the target device or by use of an software encryption process running in secure mode on the processor itself or some other on-chip processing resource, or by use of a encryption function that is implemented in hardware.

To enhance performance, in certain cases where a secure process may have a large working set or is frequently interrupted (e.g., entailing many page swaps) a subset of the processes working set that is considered "secure" may be created (e.g., only a subset of the dirty cache lines for the process may be associated with the secure descriptor) and only encrypt those cache lines or the portion of the cache containing those lines, when it is written out to external memory.

Additionally, to enhance performance, an off-chip storage mechanism (e.g., a page swapping module) can be run asynchronously in parallel with an interrupting process (e.g., using a DMA unit with integrated AES encryption hardware acceleration) and thus, could be designed to have a minimal impact on the main processor performance. In another embodiment, a separate secure "working set encapsulation" software module may be used to perform the encryption prior to allowing working set data to be written out to memory.

At this point in the discussion, it may be helpful to show an example of how a One-Way Compound Key may be constructed in general terms, prior to discussing a more specific example. Referring now to FIG. 15, a general structure consisting of a first One-Way Hash function 1510, its associated input data set 1520 and its resultant output 1523. In this example, the input data set 1520 can be further broken down into three components, Secret Key 1521, Precursor Key 1522 and Payload Data 1 1523.

Note that the names and formats of these input data elements 1521, 1522 and 1523 as well as that of the resultant output 1532 (which we call Compound Key 1) are specified in this example simply as a convenience of reference. In fact, the format for any of these input data set elements may not be fixed. One-Way Hash function 1510 may have no knowledge of the structure of its input data set 1520, nor does it matter how large the input data 1520 set may be.

In most cases, the size of the resultant output 1532 of the first One-Way Hash function 1510 is typically constant in size, no matter how large the input data set 1520 may be. This feature is typically referred to as the built-in "data compression" functionality of any One-Way Hash function. Although the built-in data compression property may be utilized the following examples, the overall structure of embodiments of the systems depicted herein do not depend on this data compression function.

Looking still at FIG. 15 the resultant output 1532 of first application of One-Way Hash function 1510 can also then be used in conjunction with the Secret Key 1521 that was used earlier and a corresponding Payload Data 2 1533 to form the input data set 1530 for second application of One-Way Hash function 1540. Note that for ease of implementation, first One-Way Hash function 1510 and second One-Way Hash function 1540 may, in fact, be identical in operation, but may also be different. Also, for this example, the same Secret Key 1521 is used as a part of the input data set to both first One-Way Hash functions 1510 and second One-Way Hash function 1540, but these keys may also be different. The resulting output 1550 of second One-Way Hash function 1540 is then referred to as Compound Key 2.

It can be seen that this structure could easily be extended indefinitely by taking the value of output 1550 of second One-Way Hash function 1540 and inserting it into the Precursor Key position 1522 of the input data structure 1520 of first One-Way Hash function 1510. Similarly, the Payload Data 1 portion 1523 of the input data set 1520 of first One-Way Hash function 1510 may also be replaced with a different Payload Data set. As such, this concatenated structure produces a "key-chaining" mechanism whereby the eventual result may be a single, fixed-length compound key with an arbitrarily large set of dependencies. In other words, the compound encryption mechanism may be chained to allow the production of a single compound key value that is cryptographically dependent on an arbitrary number of arbitrarily large precursors using simple aggregation.

It should be further noted that, due to the One-Way nature of the hash function, then it is computationally impractical to reverse the Hash function, that is, to compute the value of the input data set 1520, given the resultant output 1532. A second useful property of a One-Way Hash function is that it is also computationally impractical to compute the value of any one of the individual input data elements (for example 1521, 1522 or 1523), even if the values of the other input data elements and the resultant output value 1532 are all known.

Similar in principle to the "chained" or "cascaded" One-Way Compound Key structure described above, it can be seen that a logically equivalent structure can be constructed using an encryption function instead of a One-Way hash function. This encryption function may be a symmetric encryption function or an asymmetric encryption function without affecting the operating principal. For purposes of this example, we will show a structure that is based on a symmetric encryption mechanism.

In contrast to the One-Way Compound key example described above, the encryption chain may be executed in either forward or reversed input/output order in order to recreate a particular intermediate key value. For this reason, the structure, which is shown in FIG. 16, is referred to as a "reversible" Compound Key construction. As with the One-Way Compound Key mechanism, the specific encryption functions performed at any of the stages in the forward or reverse process may or may not be the same. Similarly, the number of iterations through the various encryption stages can accumulate indefinitely without affecting the overall functionality of the "chained" Reversible Compound Key mechanism. It should be noted that if each of the stages in the Reversible Compound Key mechanism are implemented in software, then the overall security of the "chained" Compound Key structure may depend on the ability of the system to keep the intermediate keys secret (e.g., isolated) from other processes that are not part of the "chain". In fact, it may be desirable to keep at least some of these intermediate values isolated from any other process, whether that process is a part of the "chain" or not. Embodiments which allow such an isolation mechanism are discussed below.

Figure 17:
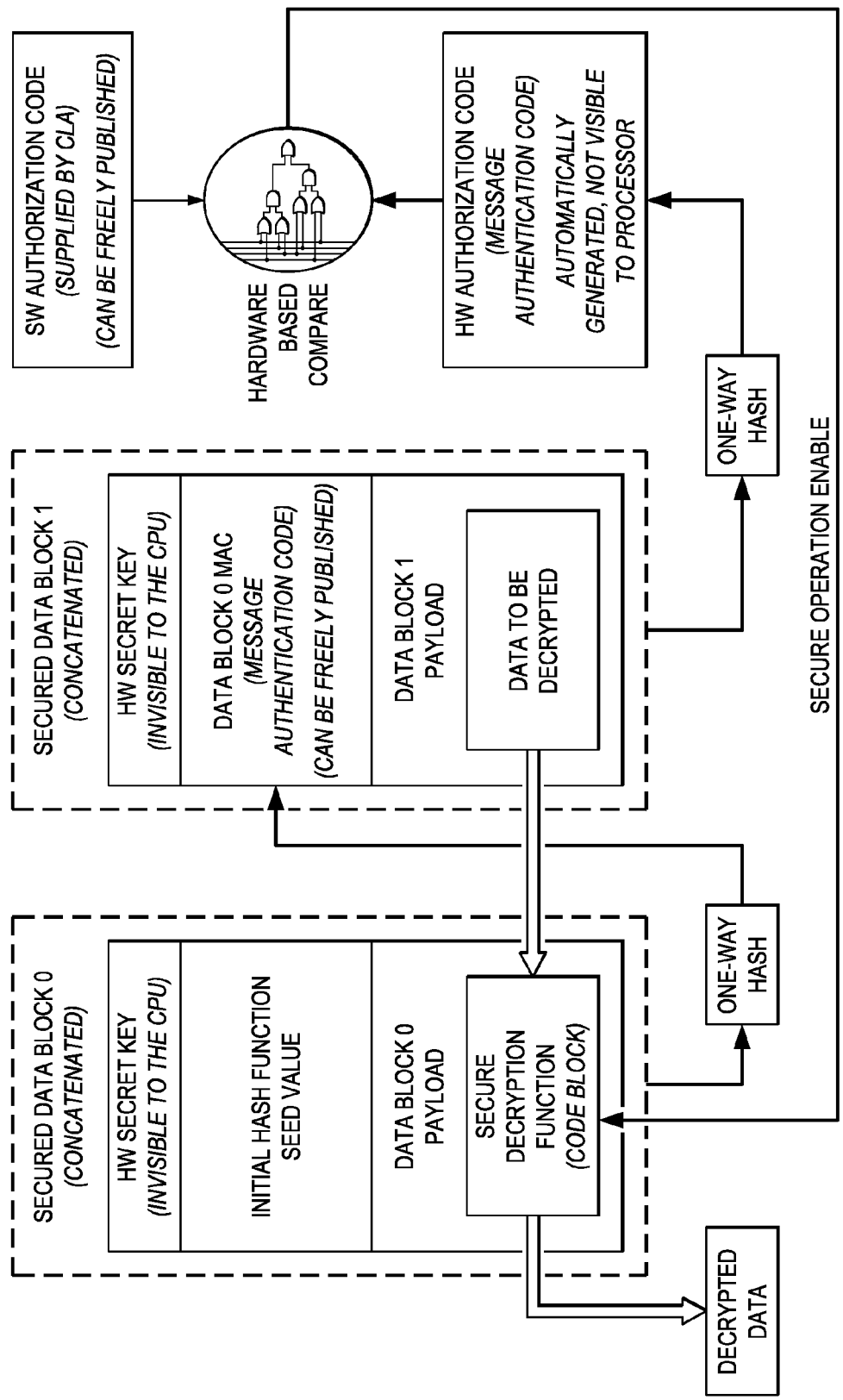
FIG. 17 depicts an embodiment of compound key generation.

It should also be noted that a "hybrid" Compound Key mechanism can be constructed, including both One-Way and Reversible Compound Key elements. An example of such a structure is shown in FIG. 17. This kind of mechanism can be useful in order to ensure security of a chain of secure processes as well as the input data that is supplied to those secure processes.

Figure 3:
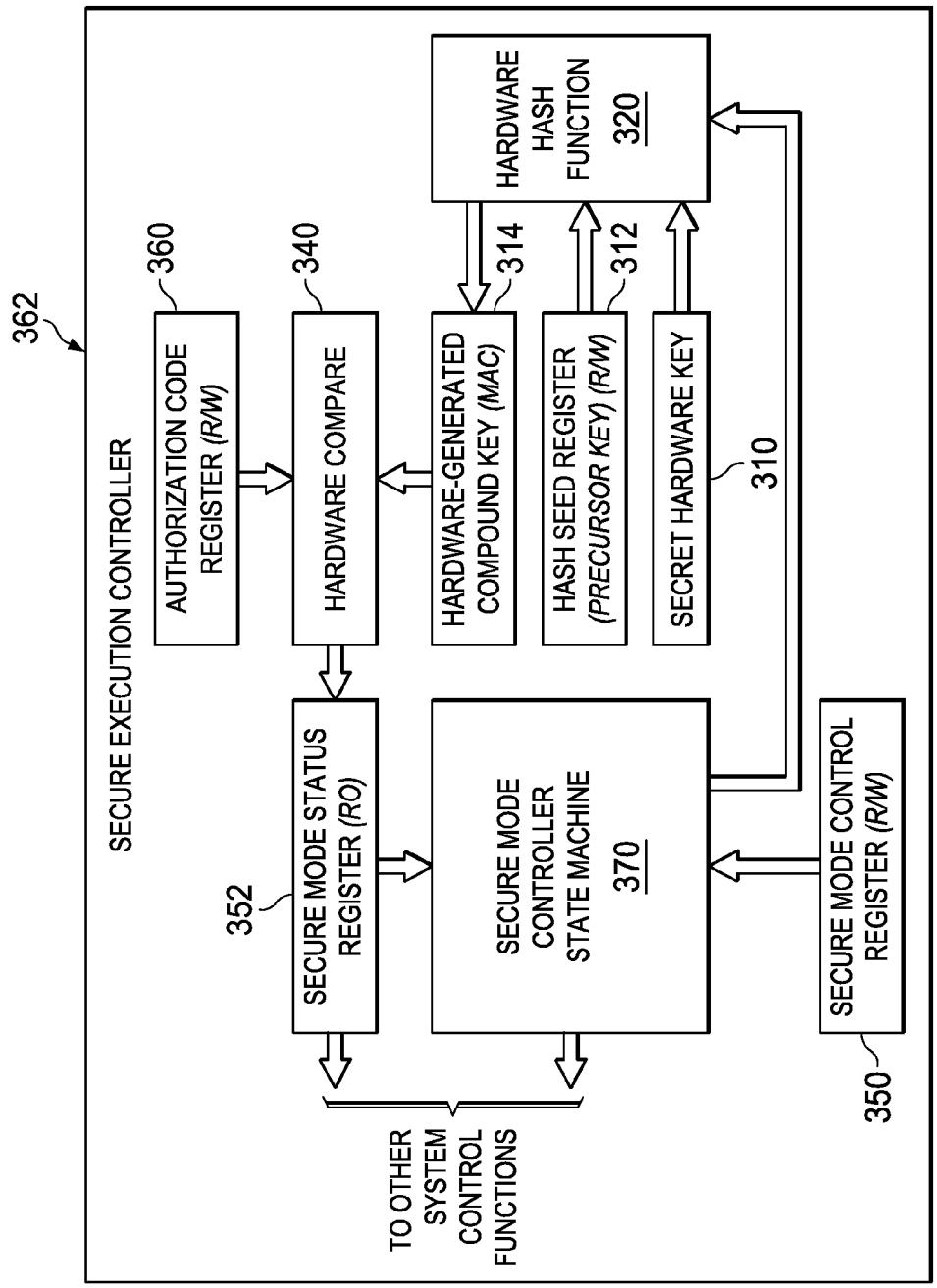
FIG. 3 depicts one embodiment of a secure execution controller.

It may now be helpful now to discuss a specific example of how the embodiments of compound key generation shown in FIG. 15 can be utilized in the architecture of embodiments of a secured execution controller and a data cache. Referring to FIG. 3, one embodiment of the architecture of a secure execution controller is depicted. In this embodiment, secure execution controller 362 is associated with a CPU of a system in which it is included and is intended to support the running of a candidate code block in secure mode on the main CPU. As such, secure execution controller 362 may comprise one or more of registers, including a secret hardware key 310 which is not visible to the CPU, secure mode control register 350, authorization code register 360, secure mode status register 352, hash seed register 312 and hardware generated compound key register 314. Of these registers, all but secret hardware key 310 may be readable by a CPU without affecting the overall security of the system, although any of these other registers may or may not be visible.

Secure mode control register 350 may be a register that may be written to in order to attempt to place the target device in a secure mode. The secure mode control register 350 may have a register into which a memory location (e.g. in an I-cache or main memory) corresponding to the beginning address of a candidate code block (e.g., a code block to be executed in secured mode) may be written and a separate register into which the length of such a candidate code block may be written. Authorization code register 360 may be a location into which an authorization code or another type of key or data may be written. Secure mode status register 352 may be a memory-mapped location comprising one or more bits that may only be set by hardware comparison block 340 and which can indicate whether or not the target device 100 is operating in secure mode.

Hardware hash function block 320 may be operable for implementing a hash function substantially in hardware to generate a compound key 314. Hardware hash function block 320 may, for example, implement a SHA 256 or some similar one-way hash function. However, this hash function may also be implemented in software or in firmware running on either a separate processor from the CPU of the system, or even a process that is run on the CPU in secure mode, using a virtual hardware hash function methodology as described earlier.

Hardware hash function block 320 may take as input one or more of the values stored in the hash seed register 312, secret hardware key 310 or data from another location, concatenate these inputs (e.g., prepend or append one input to another) and hash the resulting data set to generate a message authentication code, which we have referred to earlier as a one-way compound key.

Figure 6:
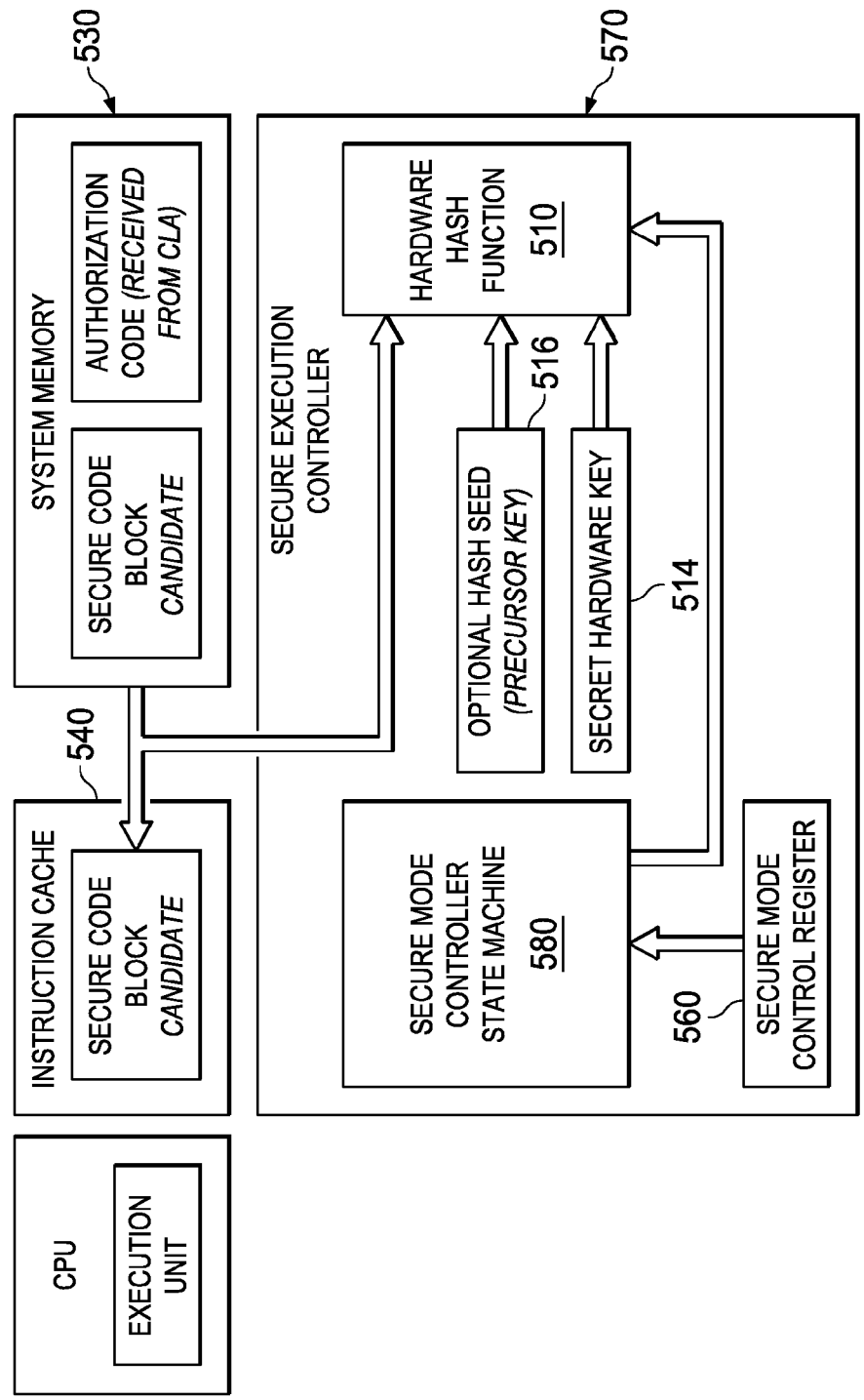
FIG. 6 depicts an embodiment of secured code block execution.

In certain embodiments, almost any numeric value can be provided as an input (precursor) for hardware hash function block 320. Referring briefly to FIG. 6, for example, the input data for the hardware hash function 510 may be constructed by a concatenation of the secret hardware key 514, the hash seed precursor key 516 and the secure code block candidate 532. There may be no fundamental difference in the operation of the hash function 510, almost no matter what the input data 514, 516 and 532 represent or how large any of these data sets may be. It should also be noted here, that the other inputs to the hardware hash function 510 that are shown coming from the secure mode controller state machine 580 represent control inputs as opposed to input data to the hash function.

Figure 7:
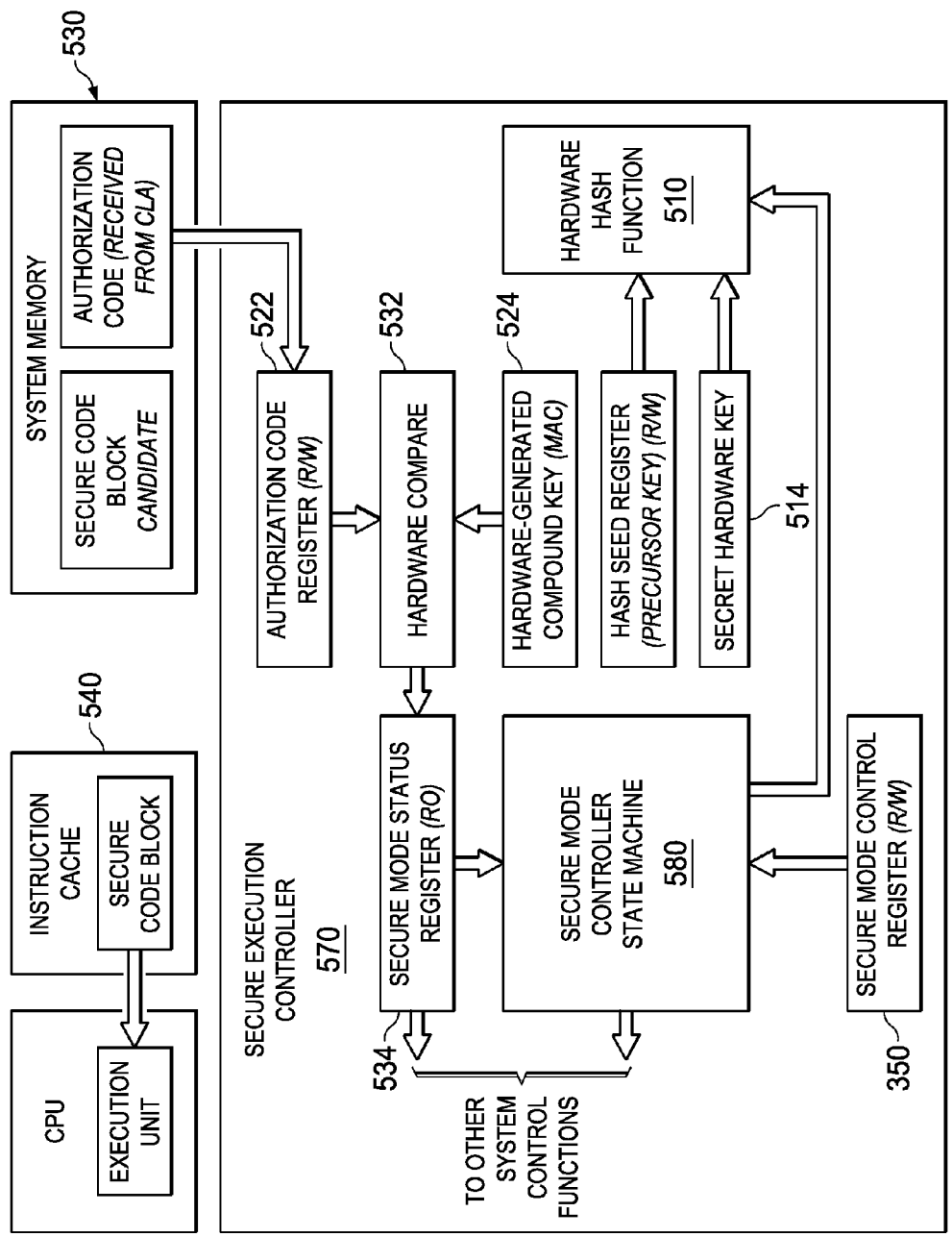
FIG. 7 depicts an embodiment of secured code block execution.

Referring briefly to FIG. 7 now, the same structure that was seen in FIG. 6 is depicted, but in this case, the resulting output of the hash function 524 is now shown. This value 524 is typically referred to as a Message Authentication Code (or MAC) in modern cryptographic literature, and this result 524 has also been referred to herein as a compound key (e.g., hardware-generated). Due to the inherent compression function of (almost all) secure one-way hash mechanisms, the resulting compound key 524 will be of constant size, almost no matter how large the input data sets that were used or even how many times the data has been iterated through the hash function 510.

Looking back now at FIG. 3, hardware generated compound key register 314 is configured to store the output of the hardware hash function block 320. Hardware comparison block 340 may be configured to compare the data in hardware generated compound key register 314 with the data in authorization code register 360. If the two values are identical the hardware comparison block 340 is configured to set the one or more bits in secure mode status register 352 that place the target device in secure mode.

Secure mode controller state machine 370 may be logic (e.g., hardware, software or some combination) that may operate based on the state of bits of secure mode control register 350 or secure mode status register 352. Secure mode controller state machine 370 is configured for controlling inputs to hardware hash function block 320, such that the precursors may be utilized in the correct manner to generate the desired output 314 of hardware hash function block 320. For example, secure mode controller state machine 370 may be configured to cause the resulting output to be loaded into hardware generated compound key register 314 at the proper time. Additionally, secure mode controller state machine 370 may be configured to cause the correct data to be written to secure mode status register 352.

Secure mode controller state machine 370 may also be configured for controlling memory access when the target device is executing in secure mode. In one embodiment, when the bits in secure mode status register 352 that indicate that the target device is now operating in secure mode, then secure mode controller state machine 370 may be configured to determine which of the pages of the data cache have been assigned to that process and store a secure descriptor for that process in the data cache in association with the one or more of the pages of the data cache. These secure process descriptors may thus be used to associate a particular set of data that is being stored in the data cache with a specific process that is executing in secured mode. Such a secure process descriptor may, for example, be the value that is based on the data that is located in authorization code register 360 or the hardware-generated compound key register 314.

Additionally, when the bits in secure mode status register 352 that place the target device in secure mode are set, secure mode controller state machine 370 may be able to receive memory accesses by the process executing in secure mode and determine if the memory access is a read or a write access.

If the data access consists of a write operation, the secured mode controller state machine 370 may be configured to determine the cache line of the data cache corresponding to the address where the data is to be written and then set a security flag associated with that cache line to indicate that the data contained in that cache line is secure. In certain embodiments, secured mode controller state machine 370 is also configured to prevent any writes to any memory location which is not in the data cache, for example by disabling write-through, write-back or other operations of the data cache or memory controllers of the target device.

If the access is a read access the secured mode controller state machine 370 may be configured to determine if a cache miss has occurred and if the requested address was not previously stored in the data cache the secured mode controller state machine 370 may be configured to allow the requested data to be read from main memory and placed in the data cache in a page associated with the process. If a cache hit occurs the secured mode controller state machine 370 may be configured to the determine the cache line corresponding to the address of the memory access and check the security flag associated with that cache line to determine if it is set. If the security flag is not set the memory access may be allowed to proceed (e.g., the data read from the cache line).

Alternatively, if a security flag associated with the cache line in the data cache corresponding to the address from which data is to be read is set secured mode controller state machine 370 may be configured to obtain the secure process descriptor associated with the page in the data cache containing that cache line and compare it with a secure process descriptor associated with the currently executing. If the secure process descriptors match, then the memory access may be allowed to proceed. If the secure descriptors do not match, another action may be taken such as either returning a garbage or preset value in response to the memory access or alternately returning a "no-valid data" at that address message to the CPU, whereupon the CPU memory management unit may then request a replacement cache line to read in from system memory.

In one embodiment, only the data cache is used to store the entire working set of a process executing in secure mode and any writes to memory other than to the data cache by the process may be disabled. Additionally, any lines of the data cache that are written to (e.g., so-called "dirty" cache lines) while in secure mode are associated with a secure process descriptor that may uniquely and precisely specify which process to whom the "dirty" cache line belongs. Access to these cache lines may only be allowed to the owner of the particular "dirty" cache line such that any cache line modified during the operation of a secure process is unreadable by any other process, even after the original process has terminated. Thus, data that belongs to one instance of a process is unambiguously isolated from any other process.

Figure 4A:
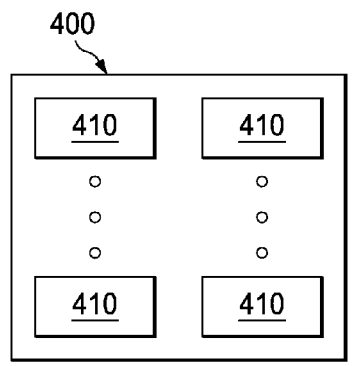
FIGS. 4A and 4B depict an embodiment of a cache used for process working set isolation.
Figure 4B:
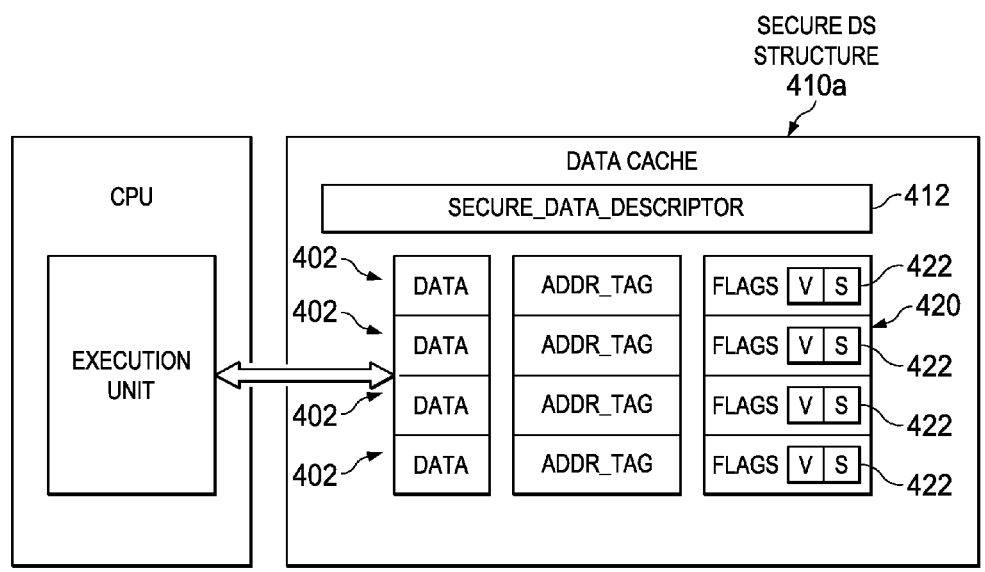

Moving now to FIGS. 4A and 4B, one embodiment of the architecture of a data cache that may be utilized to effectuate isolation of working sets of processes according to certain embodiments as presented herein is depicted. Referring first to FIG. 4A, data cache 400 may be almost any type of cache, including a L1 cache a L2 cache, a direct mapped cache, a 2-way set associative cache, a 4-way set associative, a 2-way skewed associative cache, etc. that may be implemented in conjunction with almost any management or write policies desired. The cache 400 may comprise a set of pages 410. When used when referring to the cache herein, a page may be understood to mean cache block or a cache set. The data cache 400 is configured to store a secure descriptor associated with one or more pages 410 of the cache.

FIG. 4B depicts a view of one embodiment of a page 410*a* of cache 400. Here, the cache comprises logic 412 designed to store a secure process descriptor in association with the page 410*a* and to provide the secure process descriptor in response to a request for the secure process descriptor for page 410*a* or in conjunction with a read to a cache line 402 of page 410*a*. Each cache line 402 of the page 410*a* includes bits for the data, address tags and flags 420. The flags 420 may include bits such as a valid bit or dirty bit. In addition, flags 420 may include a secure bit 422. Cache 400 may be configured such that a secure bit 422 for a cache line 402 may be set (e.g., when a process executing in secure mode writes to that cache line 402).

It will now be useful to explain how embodiments of such a target device may be place in secured mode. Again, a better understanding of certain embodiments may be gleaned from a review of U.S. patent application Ser. No. 12/615,843, entitled "Method and System for Control of Code execution on a General Purpose Computing Device and Control of Code Execution in an Recursive Security Protocol," filed Nov. 10, 2009, hereby incorporated by reference in its entirety for all purposes.

It should be noted that, in one embodiment, the procedure by which any generic (or otherwise) block of code (which will be referred to as a "secure work function") may be executed in secure mode on embodiments of a system such as those described herein is to execute a pair of extra functions, one on either side (e.g., before or after) of the secure work function. A function (or set of functions) that is executed immediately prior to a secure work function will be referred to as the "prologue" and a function (or set of functions) which is executed immediately after the secure work function will be referred to as the "epilogue".

Thus, in one embodiment, in order to execute a secure work function on a CPU, then that secure work function should be preceded by a prologue and followed by an epilogue. In certain embodiments, the purpose of the prologue is at least threefold. First, the prologue should prepare the input arguments that are passed to the secure work function for use by the secure work function. This preparation may involve, for example, a decryption process, which may be required for those input arguments that may not be passed to the secure work function in the clear. A second function of the prologue may be to construct a compound key whose value is dependent on a number of data elements. Such data elements may include the hardware secret key of the target device, the Authorization Code of the parent (e.g., calling) function, a list of one or more input arguments to the secure work function (either in encrypted or non-encrypted form), the executable image of the secure work function itself, or some other information that may be used in determining whether or not the secure work function should be allowed to execute on the target device in secure mode. A third function of the prologue could be to initiate a request that the CPU begin executing the secure work function in secure mode.

The purpose of the epilogue may be to "clean up" after the execution of the secure work function is complete. One function the epilogue may be to prepare any designated output parameters for use by subsequent code blocks (e.g., to be executed after the secure work function), be they secure or not. For example, this preparation may involve encrypting of the designated output (or returned data) from the secure work function so that any observing process other than the intended recipient of such output arguments, including either hardware or software-based observers, may be precluded from effectively intercepting that data. In such a case, the encryption key that may be used may be a reversible compound key that is passed to the secure routine as one of its calling arguments.

A second function of the epilogue may be to either programmatically or automatically invalidate those portions of a data cache that have been written to while the secure work function (e.g., by the secure work function) was executing. Thus, in the case where a secure work function may have had its operation suspended and then resumed, the data values that were written to a secure portion of the data cache prior to the process being suspended may thus be available to the resumed secure process without having to page these secure data locations out to memory (which may involve an intervening encryption process). Then, once the secure function had been resumed, these same data cache locations may then be made available to the secure function, since the secure process descriptor may match the currently executing authorization code, or some derivative thereof (or another value being used as a secure process descriptor).

However, once a secure process had terminated (for example, using an epilogue function), then these same secure data cache locations may be marked as invalid during the epilogue function. This invalidation process would prevent any unintended potential "leakage" of data that may still be resident in the secure portion of the data cache from being accessed after the secure work function has terminated properly.

In this manner, even if a secure work function is repeated and if it is given the same secure process descriptor twice in a row, the second iteration of this secure work function will nonetheless be unable to access the working set data from the first iteration of that same secure work function, despite the fact that they might have the same secure process descriptor for both iterations. It will be noted that the descriptions of the prologue and epilogue are provided by way of example and that more or fewer functions may be accomplished by the prologue of the epilogue and that additionally, these function (or additional or fewer function) may be accomplished in another manner without departing from the scope of embodiments as described.

Figure 5:
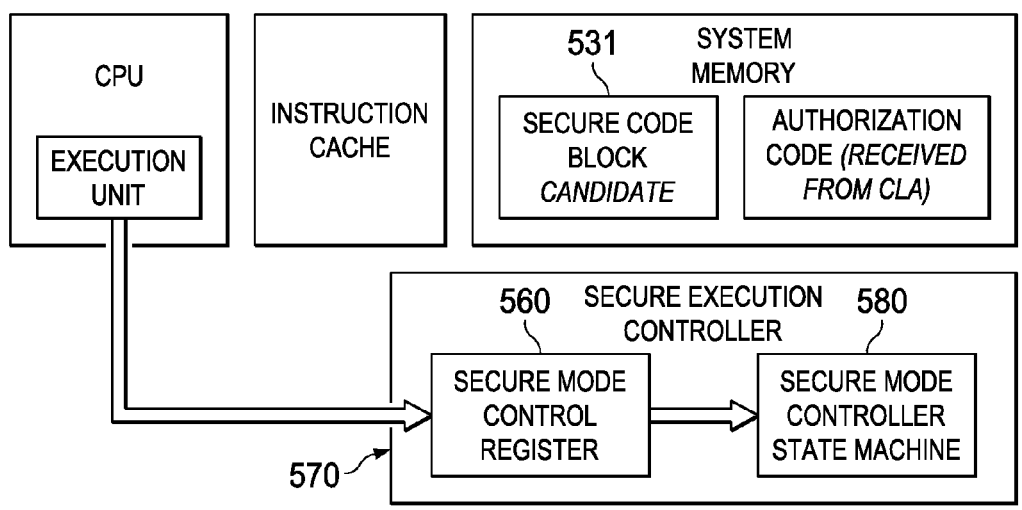
FIG. 5 depicts an embodiment of secured code block execution.

FIGS. 5-7 depict a block diagram of one embodiment of a flow for placing a target device in secure mode. Referring first to FIG. 5, initially, a code block 531 may be configured to execute in secured mode. Such a code block may be received, for example, from a content distribution system or loaded from a computer readable medium, etc. Additionally, an authorization code may be received, for example, from a licensing authority, read from a computer readable medium, input by a user, etc. Both the code block (referred to as a candidate code block at some locations herein, as it is a "candidate" to execute in secure mode) and the authorization code 520 may be stored in the main memory 530 of the target device.

Note that, in this embodiment, the candidate code block is comprised of a prologue function, a secure work function and an epilogue function, in that order. In such an embodiment, then, the Authorization Code that would be associated with the secure work function may include dependencies on all three functional sections of the candidate code block. However, in some embodiments, the prologue and epilogue functions may be implemented substantially in a fixed manner (in other words, in hardware or firmware). In that case, then it is possible that the Authorization Code for the candidate code block may have more limited dependencies on the prologue and epilogue functions.

Accordingly, when the candidate code block 510 is loaded into I-cache 540 and begins to be executed by CPU execution unit 550, CPU execution unit 550 may access secure mode control register 560 of secure execution controller 570 and set the bits of secure mode control register 560 to initiate the placement of the target device in secure mode. Additionally, the memory location (e.g., the location in I-cache to which the code block 531 is being transferred or the location in main memory 530) of the candidate code block 531 along with the length of the candidate code block 531 may be written into the secure mode control register 560. Based upon the setting of bits in secure mode control register 560, secure mode controller state machine 580 may perform one or more functions.

Moving on to FIG. 6, secure mode controller state machine 580 may then configure the target device such that the candidate code block 531 is provided to the hardware hash block 510 of the secure execution controller 570. This configuration may be done, for example, based on the location in memory of the candidate code block written into secure mode control register 560.

In one embodiment, the secure mode controller state machine 580 may go out to main memory 530 and fetch the candidate code block 531 in order to explicitly load the candidate code block into the I-cache 540. In another embodiment, the secure mode controller state machine 580 may observe the data bus transactions as some other portion of the target device loads the candidate code block 531 from main memory 530 into the I-cache 540, confirming that the candidate code block 510 has been loaded in its entirety into the I-cache 540.

In another embodiment, the secure mode controller state machine 580 may cause another portion of the target device to perform this transfer from main memory 530 into the I-cache 540. In yet another embodiment, the secure mode controller state machine 580 may observe the data transferred from main memory 530 and keep track of the data as it is transferred into the I-cache 540.

In one embodiment, the bits comprising the candidate code block 531 may be provided to the hardware hash function block 510 as they are transferred across a bus from the main memory 530 to the I-cache 540. Using the received candidate code block 531 the hardware hash block 512 may create a compound key from the candidate code block 531, secret hardware key 514 and optionally one or more other precursor values stored in hash seed register 516.

Turning to FIG. 7, at some point, in order to begin secure execution of the candidate code block, CPU execution unit may write authorization code 520 associated with candidate code block 531 into authorization code register 522 of secure execution controller 570. When the compound key is generated by the hardware hash block 512 it is written to hardware generated compound key register 524. Secured mode controller state machine 580 is then configured to initiate a comparison between the value in hardware generated compound key register 524 and the value in authorization code register 522. If these values match, hardware comparison block 532 may write the bits in secure mode status register 534 that place the target device in secure mode. The code block 510 can then be executed by the CPU execution unit 550 in secured mode. If the values do not match, the target device will not be placed in secure mode, however, the code block 510 may (or may not) be still allowed to execute (although not in secured mode).

As can be seen then, execution of code in secured mode can be controlled through the use of a provided authorization code. This authorization code may be a compound key (DS), that is both cryptographically dependent on the candidate code block distributed to the target device and bound to each target device (e.g., using the secret key of that target device).

Accordingly, to enable a candidate code block to run in secure mode on a particular target device the correct authorization code (e.g., constructed using both the candidate code block and the secret key of the target device) must be provided. No other target device can run the candidate code block correctly with that authorization code and no other compound key works with that candidate code block on that target device.

Consequently, as the secret key of a target device can only be accessed when the target device is executing in secure mode (or, for example, in certain other instances such as when determining if the target device should be placed in secured mode) a dependency similar to a circular dependency has been created. Only some entity (e.g., a licensing authority) in possession of a device's secret key in the first place can generate a compound key to allow a particular code block to run in secure mode on that target device. Thus, an entity may need a-priori knowledge of a device's secret key before they can authorize a piece of code to access that key. If an entity does not have access to the correct value of the secret key it cannot generate a valid compound key to authorize that code to execute in secure mode.

Furthermore, because the compound key provided by the licensing authority was created using the original code block and the secret key, it can be assured that the candidate code block on the target device has not been modified or tampered with before placing the device in secure mode, as if the candidate code block has been modified in any way the compound key generated at the target device will not match the compound key received (e.g., from the licensing authority) and thus the target device will not be placed in secured mode.

In this manner, then, the use of the hash function on the target device validates that the candidate code block has not been tampered with and (e.g., by use of the compound key "chaining" method described earlier) ensures the order of execution of processes, as well as verifies that the candidate code block is authorized to run in secure mode on the target device. In order to maintain overall operational security of the system it is then further desired, in one embodiment, to ensure that, when executing a code block as a process in secure mode: calling arguments have not been modified (maliciously or otherwise); a process is executed to completion (e.g., with or without interruption) and the working set of the process remains isolated from external observation.

In one embodiment, the first of these three desired (ensuring calling arguments have not been modified) is achievable if the calling arguments (or an appropriate subset thereof) are included with the rest of a candidate code block to be secured by the hash function. This concept was discussed above with respect to embodiments of the contents of a candidate code block.

The latter two desires (referred to respectively as execution-to-completion and working-set-isolation) can also be addressed in certain embodiments using the compound key or the recursive execution components described herein. As mentioned above, embodiments of ensuring execution to completion are disclosed and discussed in U.S. patent application Ser. No. 12/615,843, entitled "Method and System for Control of Code execution on a General Purpose Computing Device and Control of Code Execution in an Recursive Security Protocol," filed Nov. 10, 2009, hereby incorporated herein in its entirety.

Turning then to working set isolation, it may be desired that any data that is modified or generated during the execution of a process in secure mode (other than possibly returned arguments) remain unreadable by any other process, even after the original process has terminated. Working set isolation may be more complicated than just ensuring that any of the system memory (e.g., data cache or main memory) that is used when executing a process in secure mode is isolated from external observation as there are a number of well-known side-channel or indirect methods for attacking an otherwise closed security system, of which timing attacks and Differential Power Analysis (DPA) are a couple of the more powerful of such widely-practiced schemes.

To ensure working set isolation then, in certain embodiments when the target device is executing secured mode (e.g., when the bit of secure mode status register used to place the target device in secure mode is set) the data cache of the processor may be used to store the entire working set of the currently executing secure code segment and writes by the process to any other part of memory may be disallowed and write-through or write-back of the lines of the data cache (or any other type of memory synchronization between the data cache and main memory) may also be disallowed. Additionally, any lines of the data cache that are written to by the secure process while in secure mode may be tagged with a unique secure process descriptor that uniquely and precisely specifies the process to which that data cache line belongs. Access to those data cache lines (or pages) may then be restricted to only the process associated with that secure descriptor.

Accordingly, in certain embodiments, the secure process descriptor is sufficiently unique to be able to not only distinguish between different processes from different code blocks, but also between different processes resulting from executing the same code block at different times. Accordingly, a secure descriptor can be a compound key. Just as with our previous examples discussed herein, the compound key mechanism can be utilized to produce this secure descriptor without compromising the target device's secret key. In such cases, an added advantage is that the existing hardware based hash bock and hardware compare block described earlier can be used to create or compare these secure process descriptors without exposing any intermediate data to an external attacker.

In fact, in one embodiment, a simple and effective secure process descriptor that may be utilized is the authorization code associated with, and used to verify, the code block being executed in secured mode. Example precursors that may be utilized to create other examples of secure process descriptors are, for example, the target device's secret key, the message digest (e.g., authorization code) of the code block executing in secure mode, the secure process descriptor of the parent process (e.g., the calling function of the currently executing process) or the calling arguments of the currently executing process.

Of course, many other possible combinations could be used as the precursor values for this compound key-based secure process descriptor, including such variables as geographic location or time of day. The ability to dynamically limit a secure process' accessibility to even its own working set, based on such a set of variables can have a profound impact on the overall operation of the entire system. The functional implications for a secure block of code with this kind of external data dependency are enormous and this capability can be added to any code block executing in secured mode in a simple and highly efficient mechanism. Just as an example, a secure code block could be created that would only produce a correct result when the target device on which it was executing was located within a certain three-block area in midtown Manhattan between the times of 2:00 PM and 2:25 PM EST on Mar. 19, 2014.

Also, it should be noted that, in certain embodiments, if a secure code block is interrupted prior to completion, then its working set cannot be accessed by any other secure code block (potentially not even if it calls itself). As for the ability to return the result (and only the result) of a secure code segment back to its parent, the returned value(s) from the secure code block can have similarly restricted access, as was described earlier. In this case, the secure process descriptor cache tags for the child routine's return arguments would be based on the parent routine's secure process descriptor (which could itself be an argument that is passed in a similarly "secured" manner to the "child" routine). The choice can be made of whether a particular argument passed between parent and child processes is defined as a "read-only" or "read/write" data type, by using either a One-Way or Reversible Compound key construction. Once the child process secure work function terminates, then the "dirty" cache lines (e.g., those that contained data that had been written to them by the child process' secure work function) may be invalidated by the epilogue function and thus may not be able to be accessed by any process, secure or otherwise. In effect, once the secure child process terminates normally, by way of a properly constructed epilogue function, these data would logically "evaporate", since they could no longer be read by any process—even the same process that written to them in the first. Note that the affected cache lines would not have to be explicitly cleared, they would simply no longer be accessible; a highly effective and efficient means for denying access to this data.

Also, once the secure process terminates, its final act would be to pass the specific returned results back to the parent routine, potentially in encrypted form. In this case, the encryption key used would be based on the calling (parent) routine's secure process descriptor. If the secure child process is terminated prior to this final act, then the returned values will not be able to be accessed by the parent routine. This particular mechanism prevents a partial result from ever being accessed by any other process; secure or otherwise. It can easily be seen that this Working Set Isolation mechanism is both much more secure and much more granular than a simple address space bifurcation into "secure" and "not secure" memory banks, for example. Also, this functionality can be implemented with minimal overhead.

Thus, we have described a method for not only preventing "leaks" from the working set of a secure code segment, but also a method for efficiently and securely passing results back and forth between a parent code segment and its "children", based on the Compound Encryption and Attributive Authentication mechanisms. Of course, this mechanism can be implemented in a variety of methods, but this particular implementation is quite easily integrated into any existing CPU architecture with a minimal silicon area impact, absolutely no architectural dependencies and with virtually no loss in overall performance.

Figure 8:
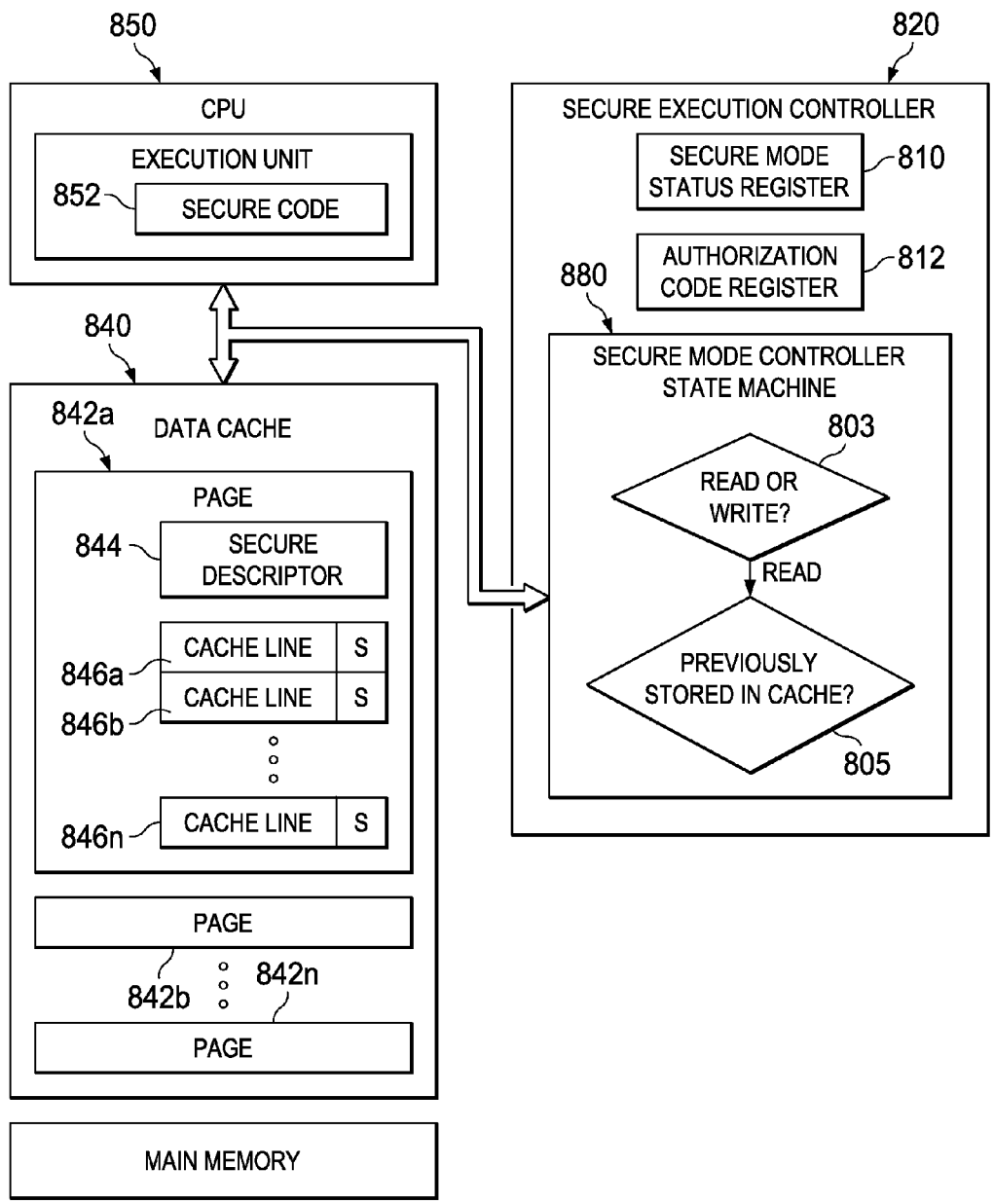
FIGS. 8-14 depicts an embodiment of process working set isolation.

It will now be useful to illustrate a flow of one embodiment of securing the working set of a process executing in secured mode. To illustrate this embodiment, attention is directed to FIGS. 8-14. Referring first to FIG. 8, it will be recalled from the discussion above that when a code block is verified the authorization code for the code block is placed in authorization code register 812 of secure execution controller 820 and when the code block is verified the bit in secure mode status register 810 placing the target device in secure mode are set and the code block 852 executed in secured mode on CPU execution unit 850. During execution of this code block 852 then, a memory access to an address may be made. Such a memory access may be received by secure mode controller state machine 880. It will be noted that the memory access may be received in a number of ways, for example, from the memory controller of the target device, from a "snoop" of the system bus, from a translation lookaside buffer or other cache management device, or in a wide variety of other manners.

When secure mode controller state machine 880 receives such a memory access, it may determine if the memory access is read access or a write access (step 803) and if it is determined that the memory access is a read access it can then be determined if the address corresponding to the memory access has been previously stored in the data cache 840 (step 805). This determination may be made, for example, based on whether a cache hit or a cache miss occurs. Again, this data may be obtained in a number of ways, such as from a memory controller, a translation lookaside buffer or other address resolution mechanism, etc.

Figure 9:
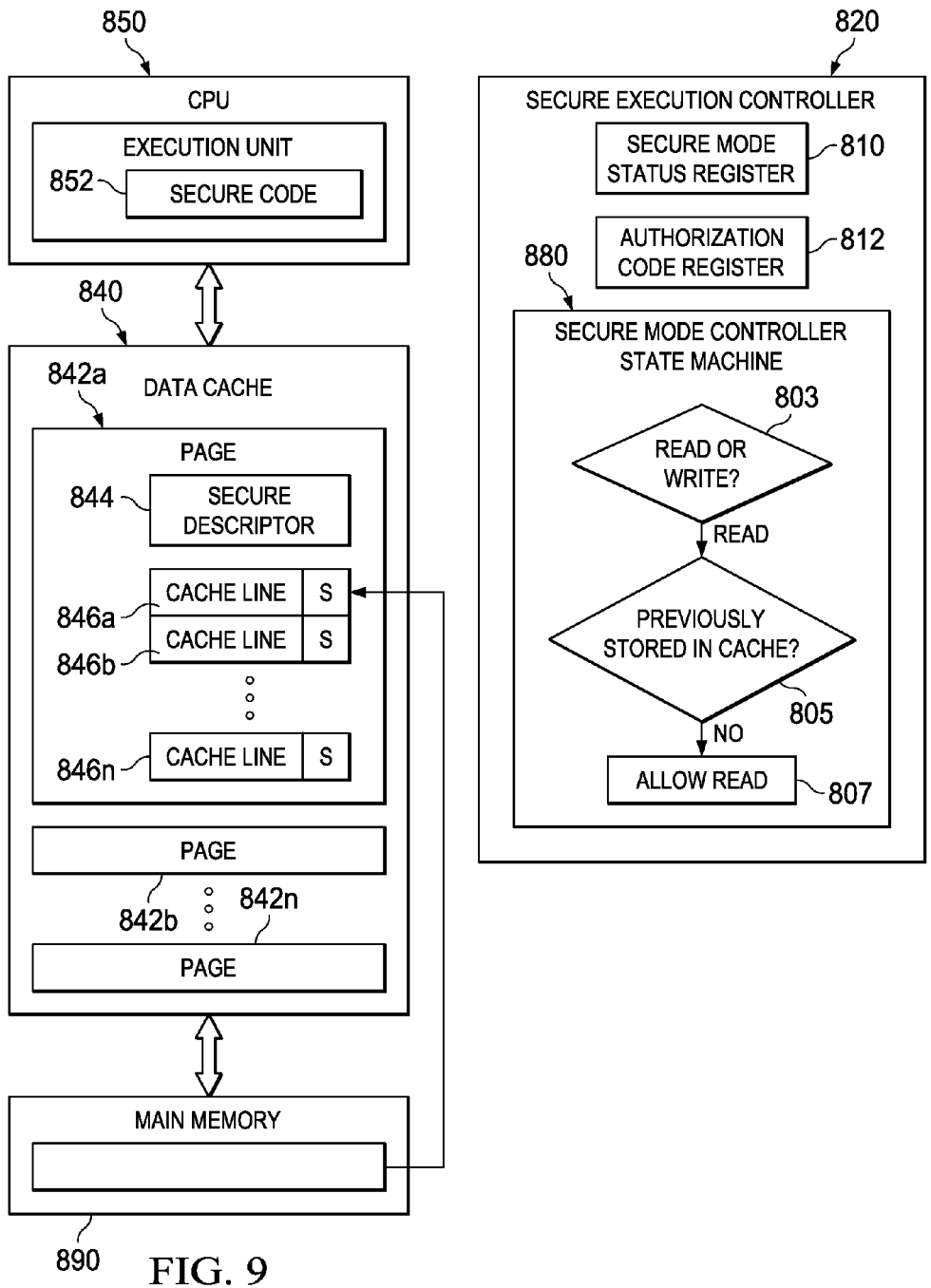

Moving to FIG. 9, if the memory access is to an address that is not been previously placed in the data cache 840 (e.g., a cache miss), the read may be allowed (step 807). The data at the desired address can then be read in from main memory 890 and placed in a line 846 in data cache 840 of a page 842 used by the currently executing process. As illustrated in the depicted example, the data associated with the requested address is read from main memory 890 and placed in cache line 846*a* of page 842*a*.

Figure 10:
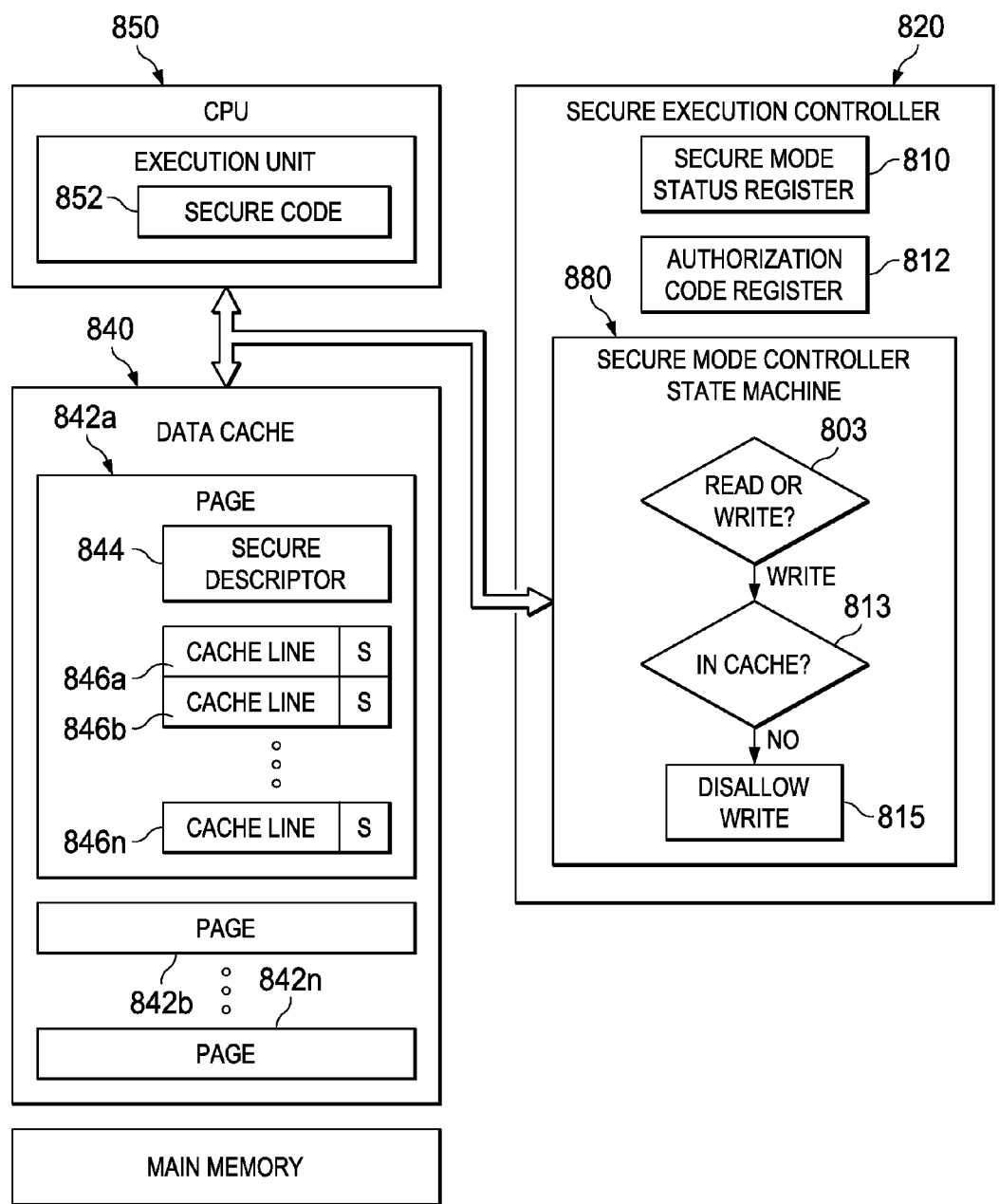
Figure 11:
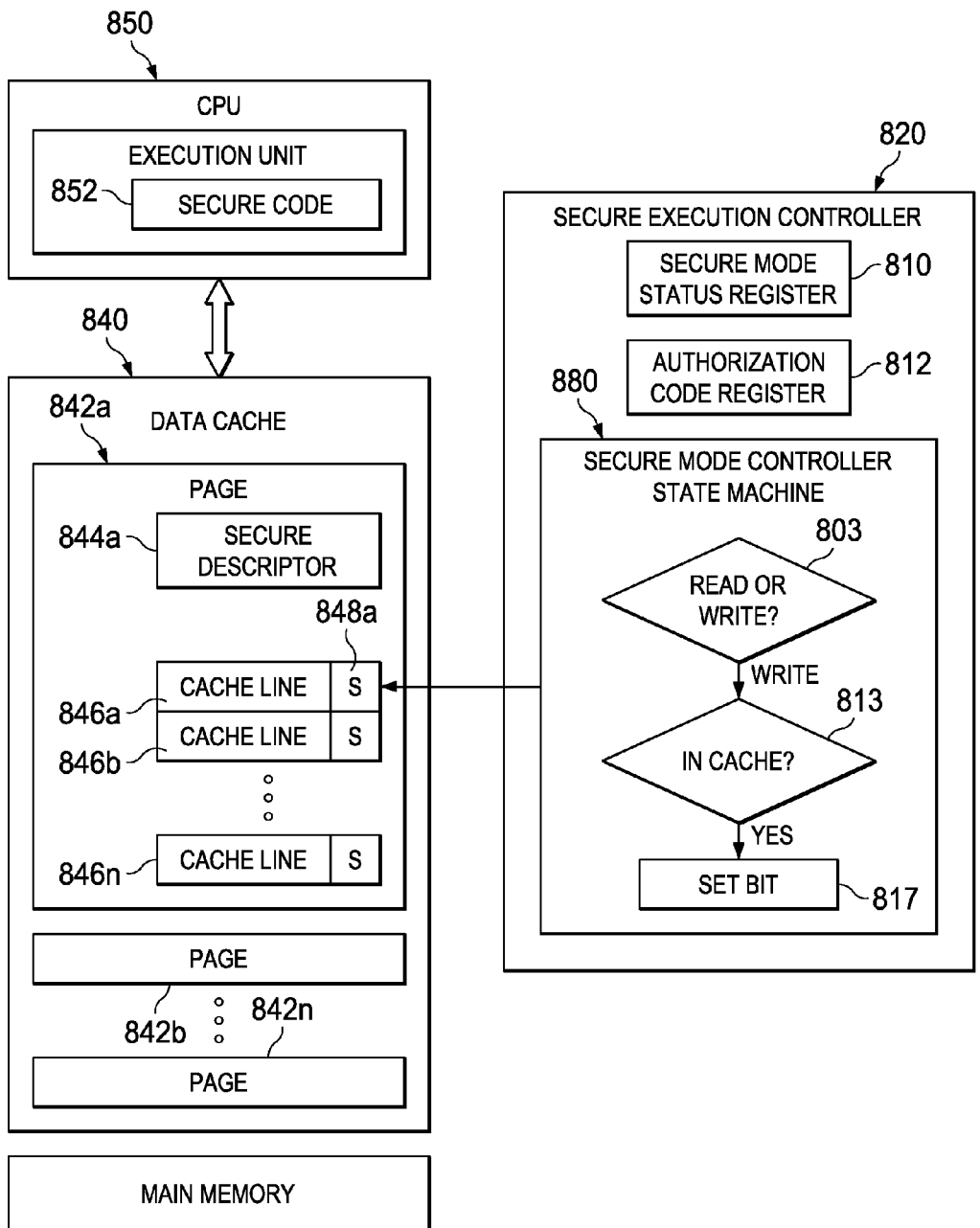

Referring to FIG. 10, if the memory access is a write (step 803), it can be determined if the write is to an address that is located within data cache 840 (step 813). If the address is not within the data cache 840 the write may be disallowed (step 815) or the write may be allowed, but to the data cache only (e.g., any data cache write-through options may be disabled). Now looking at FIG. 11, if the write is to an address that is located within data cache 840 (step 813), the write may be allowed to the appropriate cache line 846 in the page 842 containing that cache line 846. For purposes of this example, assume that the memory access is a write to the data in cache line 846*a* of page 842*a*. The secure mode controller state machine 880 may also set the security bit of the cache line 846 which was written (step 817) (in the example illustrated security bit 848*a* of cache line 846*a* of page 842*a* has been set).

Figure 12:
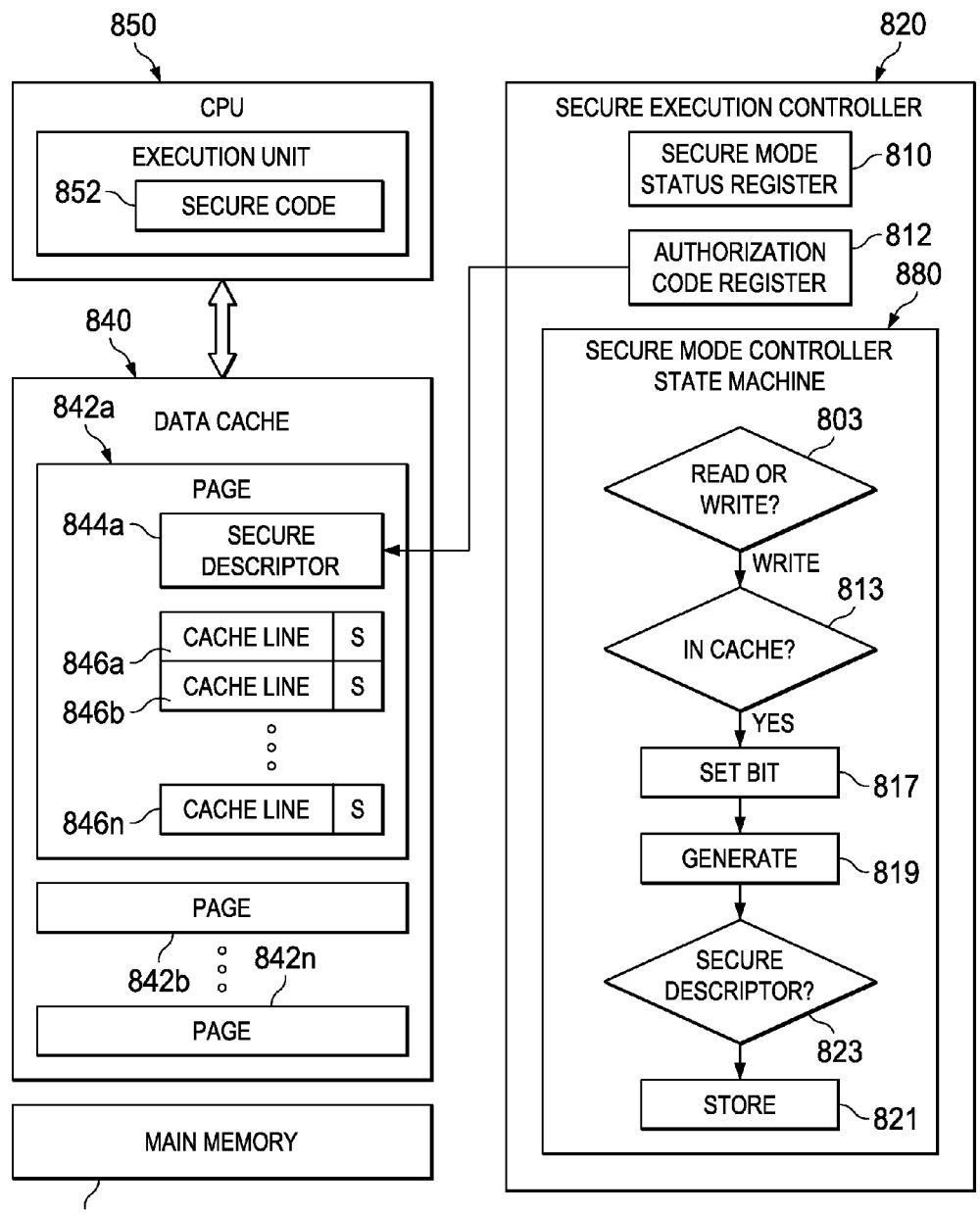

Moving to FIG. 12, if the write is to an address that that is located within data cache 840 (step 813), it can be determined if a secure process descriptor associated with the executing process may be generated (step 819) and stored (step 821) in the data cache 840 in association with the page 842 containing the cache line 846 to which the write was made. It should be noted, that these steps may only occur if such a secure process descriptor was not previously associated with the page (step 823).

In one embodiment, the secure descriptor for the executing process may be the authorization code used to verify the code block that is being executed by the current process. This authorization code may be resident in authorization code register 812 of secure execution controller 820. Thus, the authorization code in authorization code register 812 may be stored in the secure descriptor area 844 of data cache 840 associated with the page 842 containing the cache line 846 to which the write was made. In the example illustrated the authorization code in authorization code register 812 is stored in secure descriptor area 844a associated with page 842a containing cache line 846a.

Figure 13:
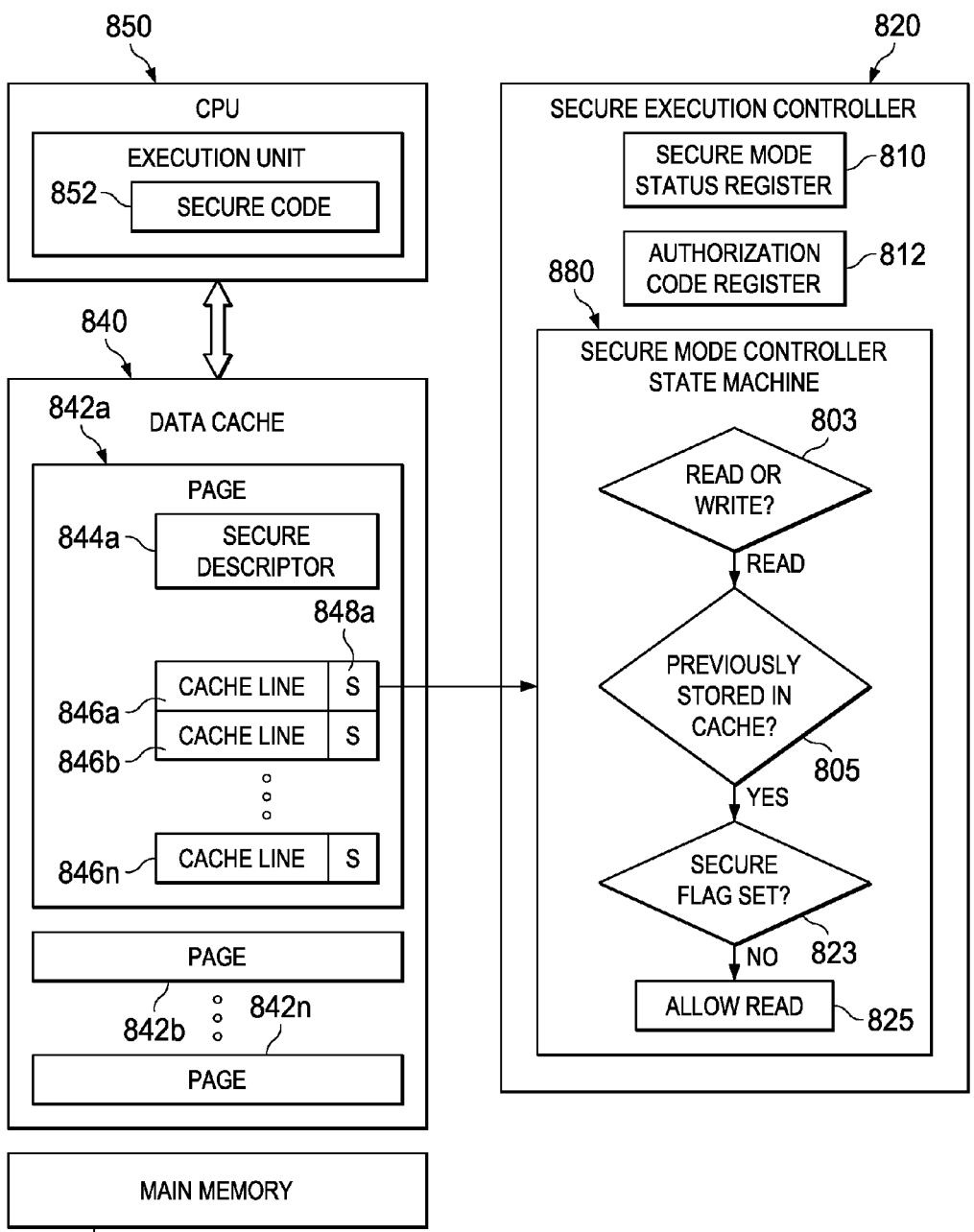

Looking at FIG. 13, if a memory access received by the secure mode controller state machine is a read (step 803) of a datum that was previously stored in data cache 840 (step 805) (e.g., a cache hit) it can be determined if the security bit 848 associated with the cache line 846 being accessed has been set (step 823). If the security bit has not been set (step 823) the read from data cache 840 may be allowed (step 825).

Figure 14:
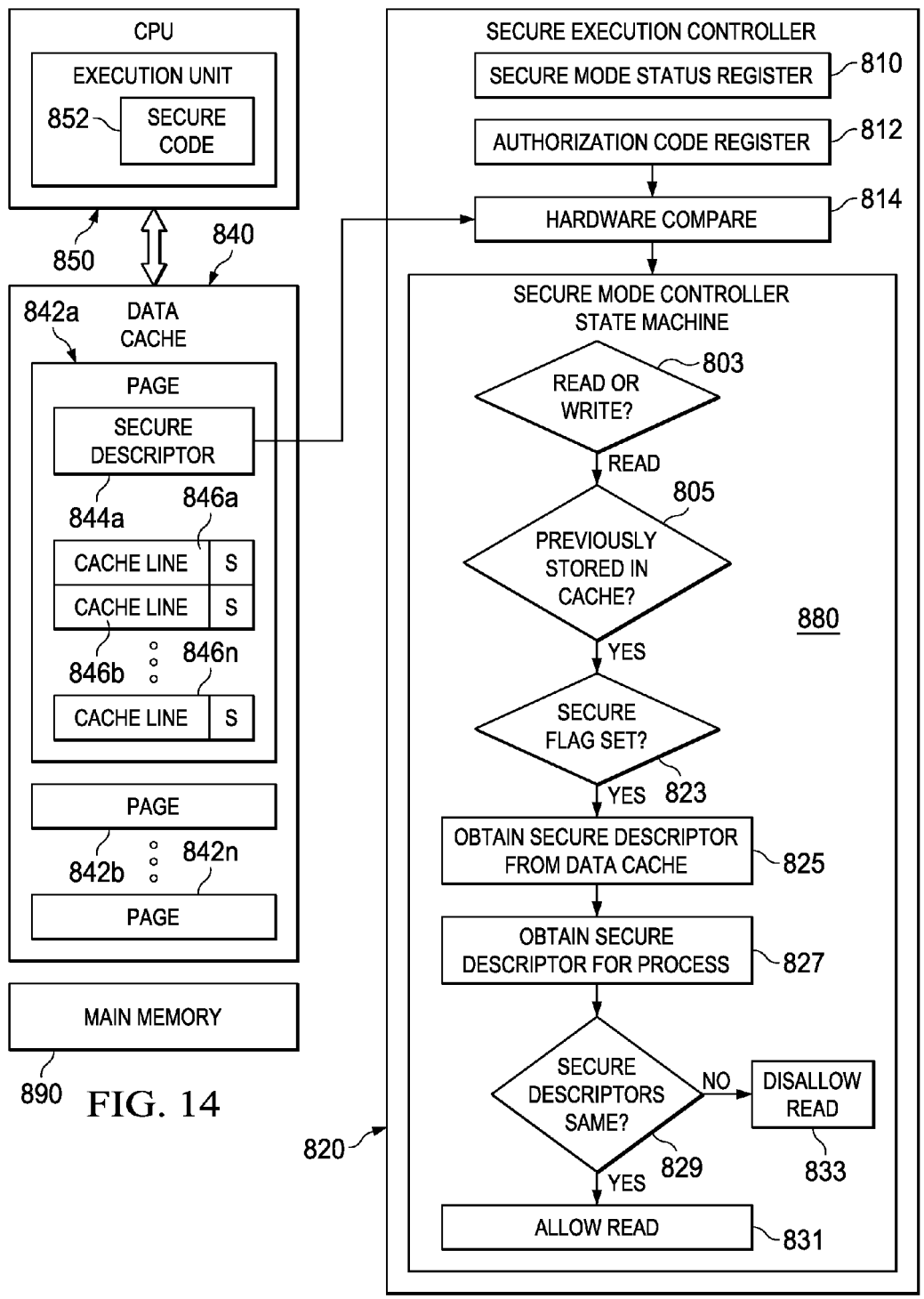

Moving on to FIG. 14, if the security bit 848 associated with the cache line 846 being accessed has been set (step 823) the secure process descriptor associated with the page 842 of the cache line 846 being accessed may be obtained (step 825) from the secure process descriptor area 844 associated with the page 842 containing the accessed cache line 846. The secure process descriptor associated with the process can then be obtained (step 827) and can then be determined if these secure descriptors are the same (step 829).

As discussed the secure process descriptor for the executing process may either be the authorization code resident in authorization code register 812 of secure execution controller 820 or some derivative value thereof. Thus, the secure process descriptor obtained from secure process descriptor area 844 associated with the page 842 containing the accessed cache line 846 may be provided to hardware compare block 814 of secure execution controller 820 where it is compared either with the authorization code resident in authorization code register 812 or some derivative value thereof. In the illustrated example, the secure process descriptor in secure process descriptor area 844a associated with page 842a containing cache line 846a has been provided to hardware compare block 814 where it is compared either with the authorization code resident in authorization code register 812 or some derivative thereof. If the secure process descriptors match the read may be allowed (step 831) otherwise it may be disallowed (step 833) and another action taken. Examples of such other actions may be providing a garbage or a fixed value, indicating a cache miss, etc.

While embodiments have been illustrated in conjunction with using an authorization code as a secure process descriptor for process executing in secure mode, as discussed above, almost any type of compound key generated from almost any desired precursors (e.g., using the secret key of the target) may be used. In such cases, other blocks of secure execution controller may be involved in the generation or comparison of such a secure process descriptor, including for example a hardware hash block of secure execution controller 820.

In certain cases, while writes outside the data cache may be disabled, the working set of a secure process may overflow the data cache. In one embodiment, any external data transactions between the CPU execution unit and an external memory bus may be encrypted during execution of a secure process (including, for example, page out operation or the like). For such an encryption process, the secure process descriptor itself or some derivative value thereof may be used as the key and that secure process descriptor or the derivative value may itself be encrypted (e.g., using a derivative value of the target device's secret key) and stored in the main memory as a part of the data set. As an advantage, there may be substantially no significant architectural changes required to implement this mechanism. The most important implications are those regarding performance in the case where the secure process has a large working set and it is frequently interrupted. In such embodiments, a subset of the working setoff the process that is considered "secure" may be created and only that portion of the cache corresponding to that "secure" working set encrypted when it is written out to main memory.

However, in a system where security is a paramount concern and where the working sets of a secure code blocks may be large, the entire working set may be encrypted prior to the point where it is placed on a memory bus. In such cases, the storage to main memory may be run asynchronously in parallel with another process (e.g., a DMA unit with integrated hardware accelerated encryption) and thus, it could be designed to have a minimal impact on the performance. In some embodiments, a separate "working set encapsulation" routine (which may itself be a secure code block designed to execute in secure mode) may be used to perform the encryption prior to allowing the working set data to be written out to main memory. Again, minimal, if any, architectural changes may be required to integrate this mechanism into almost any existing CPU.

In some embodiments, the key used to perform the encryption of the page(s) or cache lines being stored to main memory may be a derivative of the authorization code. Specifically, in one embodiment, the authorization code for the process executing in secure mode whose pages that are being stored in main memory may be used to generate a compound key (e.g., a message authentication code) using the hardware hash block using the secret key of the device and another precursor. The resulting compound key may itself be used to encrypt the authorization code to generate an ephemeral key. This ephemeral key may be used to encrypt the page of data cache to be stored in main memory which is then stored in main memory with the authorization code and the precursor used to generate the compound key.

Almost any symmetric encryption mechanism may be utilized to encrypt the pages being stored to main memory. For example, a hardware encryption block (e.g., an AES hardware block) may be utilized. Additionally, this encryption may be accomplished by encryption code running in secure mode. In such cases this encryption code may need to access cache lines or pages of the data cache associated with another process that was executed in secured mode (e.g., the data in the cache that is to be encrypted). To allow this access by such an encryption process in order to effectuate encryption of those cache lines, in one embodiment, the encryption process may use a derivative of a calling argument as its encryption key. Such a derivative may for example be the output of the hardware hash (e.g., the message authentication code) that may have been generated by using the calling argument along with a secret key and some other datum, such as a secure process descriptor of the parent or child routine, as described above. Thus, the actual key used to encrypt or decrypt the data by the encryption process may be a derivative of the passed in key, but one that can only be correctly generated by a single secure process. The encrypted pages may then be stored out to main memory without exposing any of the secure process' input or output arguments to any other processes (secure or otherwise) except those directly involved in the input/output argument transaction.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system, comprising:
   a processor;
   a memory;
   a secret key stored in hardware;
   a cache having one or more lines comprising data of one or more processes executed on the processor in a secure mode; and
   a secure execution controller configured to control access to a first line of the cache using a first secure descriptor based on the secret key and associated with a first process such that only the first process can access the first line of the cache and control access to a second line of cache using a second secure descriptor based on the secret key and associated with a second process such that only the second process can access the second line of the cache, wherein the first secure descriptor and the second secure descriptor are different secure descriptors.

2. The system of claim 1, wherein the system was placed in secure mode based on the first secure descriptor.

3. The system of claim 1, wherein the secure execution controller is configured to cause an entire working set of the first process to be stored in the cache and to cause writes to a memory location other than the cache in the secure mode to be disabled.

4. The system of claim 1, wherein the first process has terminated.

5. The system of claim 3, wherein the secure execution controller is configured to cause the first line of the cache to be associated with the first secure descriptor associated with the first process.

6. The system of claim 5, wherein the secure execution controller is configured to cause a security flag associated with the first line of the cache to be set when the first process writes the data.

7. The system of claim 6, wherein the secure execution controller is configured to control access by causing the following steps to be performed:
   determining that the first line of cache is being accessed by the first process,
   determining if the first process is executing in secure mode,
   determining a third secure descriptor associated with the first process,
   comparing the first secure descriptor and the third secure descriptor, and allowing access only if the first is executing in secure mode and the first secure descriptor matches the third secure descriptor.

8. A method, comprising:

executing one or more processes on a processor in a secure mode;

storing data in one or more lines of a cache, wherein the data was stored in a first line of the cache by a first process executed on the processor in the secure mode and in a second line of the cache by a second process executed on the processor in the secure mode; and controlling access to the first line of the cache using a first secure descriptor associated with the first process such that only the first process can access the first line of the cache and controlling access to the second line of the cache using a second secure descriptor associated with the second process such that only the second process can access the second line of the cache, wherein the first secure descriptor and the second secure descriptor are different secure descriptors and are based on a secret key stored in hardware on a system comprising the processor and the cache.

9. The method of claim 8, wherein the secure mode was entered based on the first secure descriptor.

10. The method of claim 8, further comprising storing an entire working set of the first process in the cache and disabling writes to a memory location other than the cache in the secure mode.

11. The method of claim 8, wherein the first process has terminated.

12. The method of claim 10, further comprising associating the first line of the cache with the first secure descriptor associated with the first process.

13. The method of claim 12, further comprising setting a security flag associated with the line of the cache when the first process writes the data.

14. The method of claim 13, wherein controlling access comprises:

determining that the first line of cache is being accessed by the first process, determining if the first process is executing in secure mode, determining a third secure descriptor associated with the first process, comparing the first secure descriptor and the third secure descriptor, and allowing access only if the first is executing in secure mode and the first secure descriptor matches the third secure descriptor.

15. A non-transitory computer readable medium, comprising instructions for:

executing one or more processes on a processor in a secure mode;

storing data in one or more lines of a cache, wherein the data was stored in a first line of the cache by a first process executed on the processor in the secure mode and in a second line of the cache by a second process executed on the processor in the secure mode; and controlling access to the first line of the cache using a first secure descriptor associated with the first process such that only the first process can access the first line of the cache and controlling access to the second line of the cache using a second secure descriptor associated with the second process such that only the second process can access the second line of the cache, wherein the first secure descriptor and the second secure descriptor are different secure descriptors and are based on a secret key stored in hardware on a system comprising the processor and the cache.

16. The non-transitory computer readable medium of claim 15, wherein the secure mode was entered based on the first secure descriptor.

17. The non-transitory computer readable medium of claim 15, further comprising instructions for storing an entire working set of the first process in the cache and disabling writes to a memory location other than the cache in the secure mode.

18. The non-transitory computer readable medium of claim 15, wherein the first process has terminated.

19. The non-transitory computer readable medium of claim 17, further comprising instructions for associating the first line of the cache with the first secure descriptor associated with the first process.

20. The non-transitory computer readable medium of claim 19, further comprising instructions for setting a security flag associated with the first line of the cache when the process writes the data.

21. The non-transitory computer readable medium of claim 20, wherein controlling access comprises:

determining that the first line of cache is being accessed by the first process, determining if the first process is executing in secure mode, determining a third secure descriptor associated with the first process, comparing the first secure descriptor and the third secure descriptor, and allowing access only if the first is executing in secure mode and the first secure descriptor matches the third secure descriptor.

* * * * *